(12) United States Patent  
Bricker et al.

(10) Patent No.: US 8,991,844 B2
(45) Date of Patent: Mar. 31, 2015

(54) MULTIPLE CONFIGURATION TRICYCLE

(75) Inventors: Jeffrey Bricker, Chicago, IL (US); Edward Paramadilok, Chicago, IL (US); Jason Fitzwater, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 11 days.

(21) Appl. No.: 13/540,490

(22) Filed: Jul. 2, 2012

(65) Prior Publication Data
US 2013/0056949 A1 Mar. 7, 2013

Related U.S. Application Data

(60) Provisional application No. 61/571,621, filed on Jul. 1, 2011.

(51) Int. Cl.
*B62M 11/16* (2006.01)
*B62K 9/02* (2006.01)
*B62M 1/38* (2013.01)

(52) U.S. Cl.
CPC ... *B62K 9/02* (2013.01); *B62M 1/38* (2013.01)
USPC .......................................................... 280/259

(58) Field of Classification Search
CPC ................................. B62M 11/16; B62K 9/02
USPC ................ 280/282, 259, 7.17; 192/47, 69.43, 192/217.3
See application file for complete search history.

(56) References Cited

U.S. PATENT DOCUMENTS

| | | | | |
|---|---|---|---|---|
| 1,397,174 A | * | 11/1921 | Morwood | 280/259 |
| 2,183,534 A | * | 12/1939 | Bernier | 280/87.021 |
| 2,630,333 A | * | 3/1953 | Petersen | 280/255 |
| 3,432,015 A | * | 3/1969 | Schwerdhofer | 192/43.1 |
| 4,168,846 A | | 9/1979 | Carren | |
| 4,546,991 A | | 10/1985 | Allen et al. | |
| 4,702,486 A | * | 10/1987 | Tsuchie | 280/255 |
| 4,840,260 A | * | 6/1989 | Josereau | 192/64 |
| 5,322,487 A | * | 6/1994 | Nagano | 475/297 |
| 5,356,356 A | | 10/1994 | Hildebrandt et al. | |
| 6,338,403 B1 | * | 1/2002 | Costin et al. | 192/46 |
| 6,634,711 B2 | | 10/2003 | Phillips et al. | |
| 6,644,676 B2 | * | 11/2003 | Wu | 280/259 |
| 6,685,206 B1 | * | 2/2004 | Blake | 280/278 |
| 6,752,453 B1 | | 6/2004 | Yapp | |
| D525,568 S | | 7/2006 | Baron | |
| 7,086,657 B2 | | 8/2006 | Michelau et al. | |
| D555,045 S | | 11/2007 | On | |
| D571,866 S | | 6/2008 | On | |
| D594,788 S | | 6/2009 | Hartlaub et al. | |
| D604,777 S | | 11/2009 | On | |
| 7,621,842 B2 | * | 11/2009 | Kamiya et al. | 475/296 |
| D627,265 S | | 11/2010 | On | |
| D659,056 S | | 5/2012 | Bricker et al. | |
| 2005/0247506 A1 | | 11/2005 | Rondeau et al. | |
| 2007/0045983 A1 | * | 3/2007 | Hong | 280/282 |
| 2007/0222172 A1 | * | 9/2007 | Chen | 280/259 |
| 2013/0056949 A1 | * | 3/2013 | Bricker et al. | 280/259 |

* cited by examiner

*Primary Examiner* — Joseph Rocca
*Assistant Examiner* — Gabriela C Craciun
(74) *Attorney, Agent, or Firm* — McDermott Will & Emery LLP

(57) ABSTRACT

A wheel and hub assembly for a vehicle includes a clutch dog pivotally attached to a wheel. A toothed ratchet wheel is attached to a pedal crank and positioned adjacent to the clutch dog. A hub cover includes a protrusion. The hub cover is attached to the wheel in a sliding fashion so as to slide between an unlocked position, where the protrusion engages the clutch dog so as to prevent the clutch dog from engaging the toothed ratchet wheel when the pedals are turned in a forward direction; and a locked position, where the protrusion does not engage the clutch dog so that the clutch dog engages the toothed ratchet wheel when the pedals are turned in a forward direction.

20 Claims, 36 Drawing Sheets

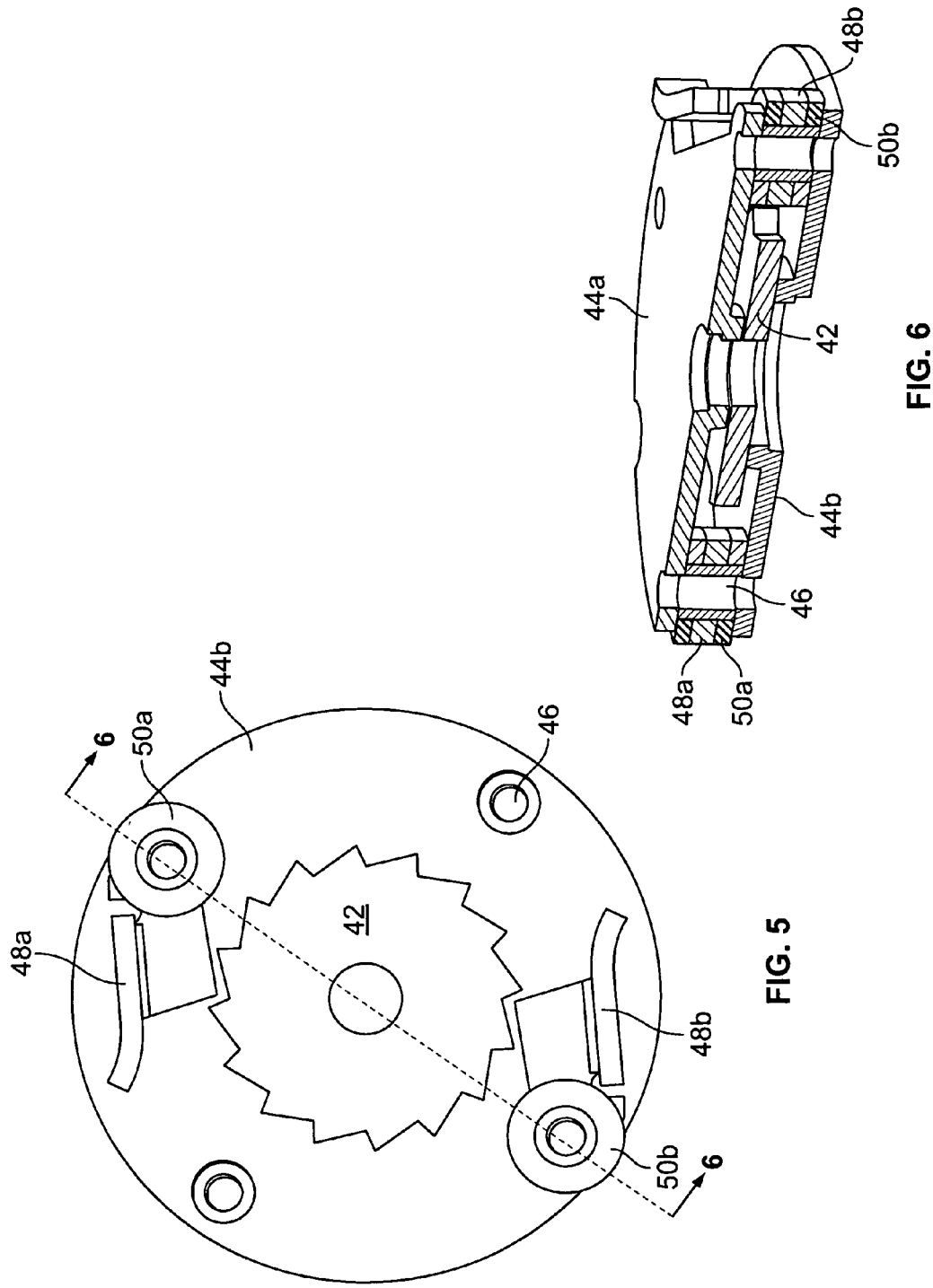

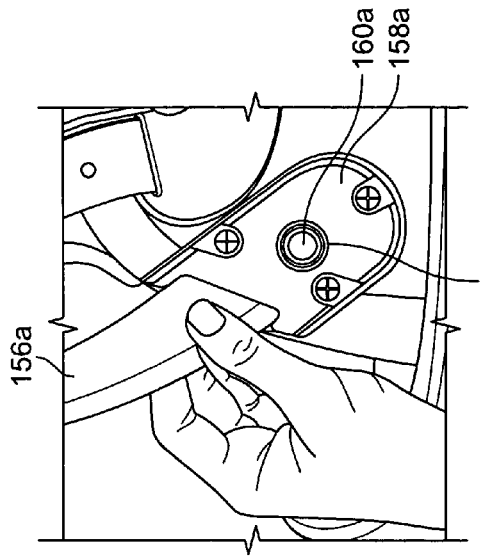
FIG. 38
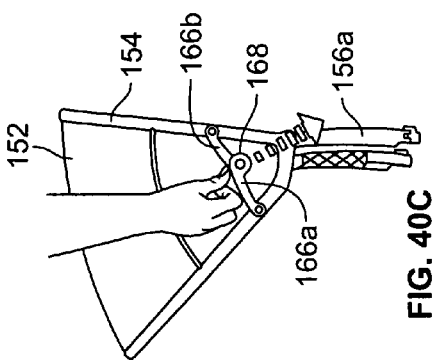
FIG. 39
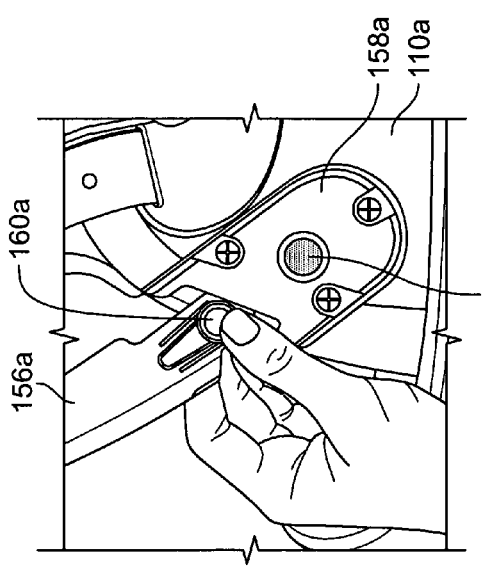
FIG. 40A
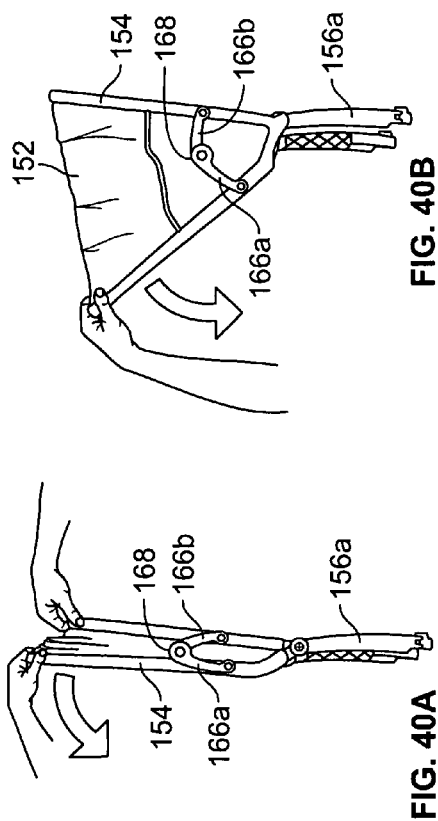
FIG. 40B
FIG. 40C

MULTIPLE CONFIGURATION TRICYCLE

CLAIM OF PRIORITY

This application claims priority from U.S. Provisional Patent Application Ser. No. 61/571,621, filed Jul. 1, 2012.

FIELD OF THE INVENTION

The present invention relates to children's tricycles and, more particularly, to a children's tricycle that features multiple configurations.

BRIEF DESCRIPTION OF THE DRAWINGS

FIG. 5 is a side elevational view of the internal components in the first embodiment of the hub of the tricycle of FIGS. 1-3B with one of the mounting plates removed;

FIG. 6 is a cross sectional view of the internal components of the hub and both mounting plates taken along line 6-6 of FIG. 5;

FIGS. 36-46 are perspective views illustrating installation of the canopy of the tricycle of FIG. 1;

DETAILED DESCRIPTION OF PREFERRED EMBODIMENTS

Figure 1:
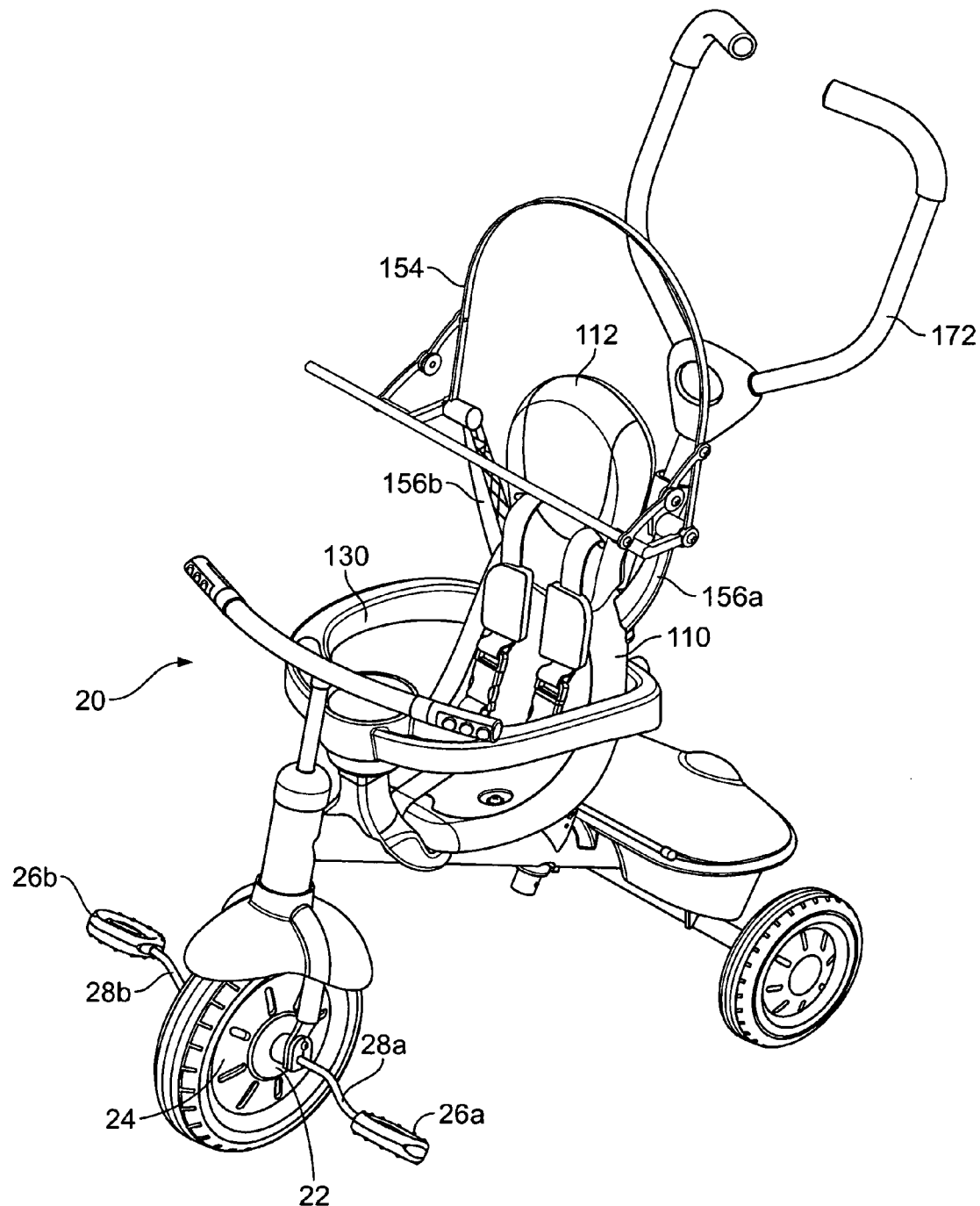
FIG. 1 is a perspective view of an embodiment of the tricycle of the present invention.
Figure 2A:
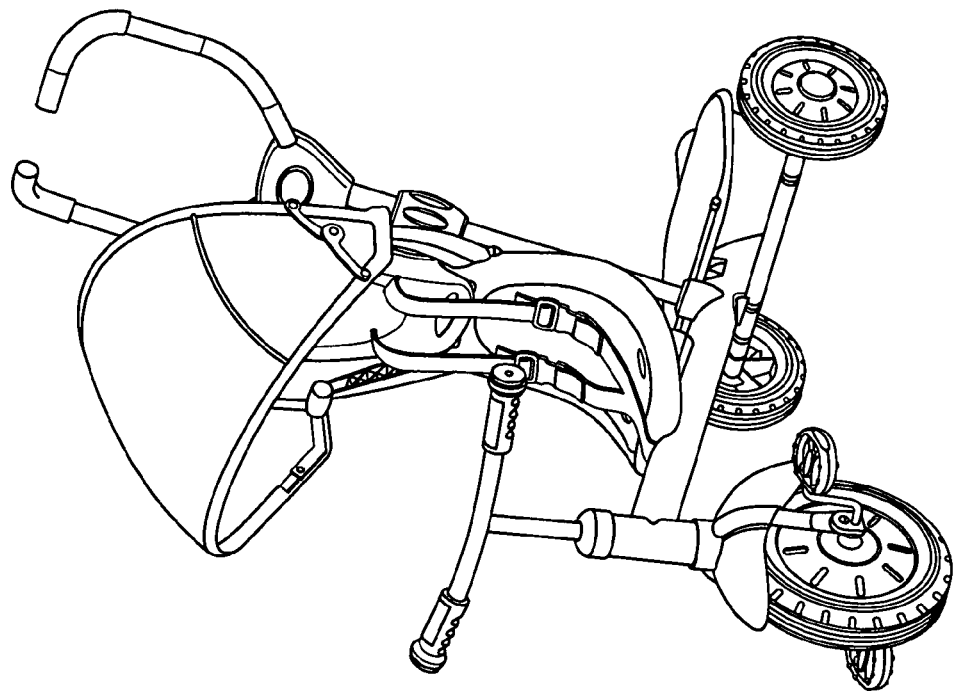
FIGS. 2A-2D are perspective views illustrating configurations of the tricycle of FIG. 1.
Figure 2B:
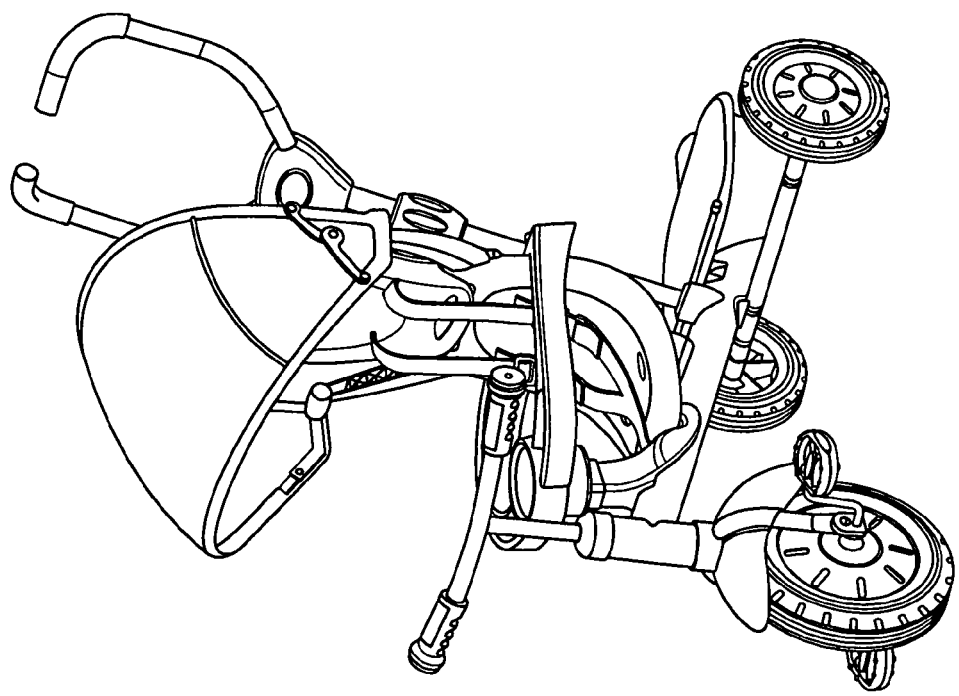

An embodiment of the multiple configuration tricycle of the present invention is indicated in general at 20 in FIGS. 1 (with the canopy fabric missing for clarity) and 2A-2D. As will be described in greater detail below, and illustrated in FIGS. 2A-2D, the tricycle may be placed in multiple configurations to make the tricycle useful for different children age ranges. For example, the configuration of FIGS. 1 and 2A permits the tricycle to be used as a stroller.

While the invention is described below in terms of a tricycle, it may be incorporated into other ride-on toys and vehicles.

Figure 2D:
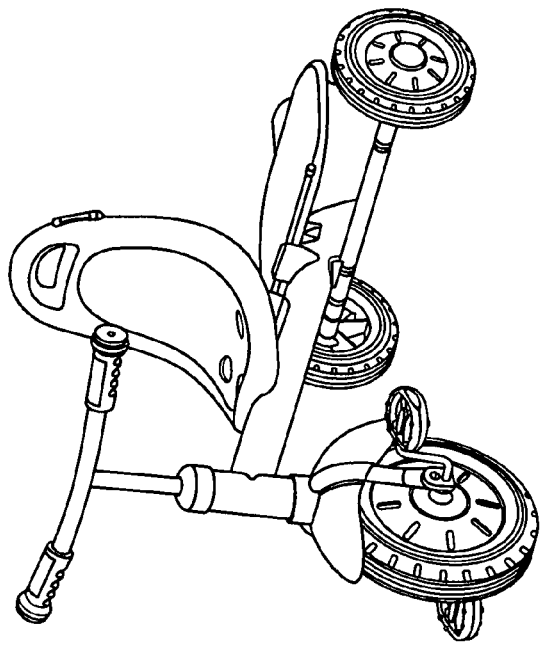
Figure 2C:
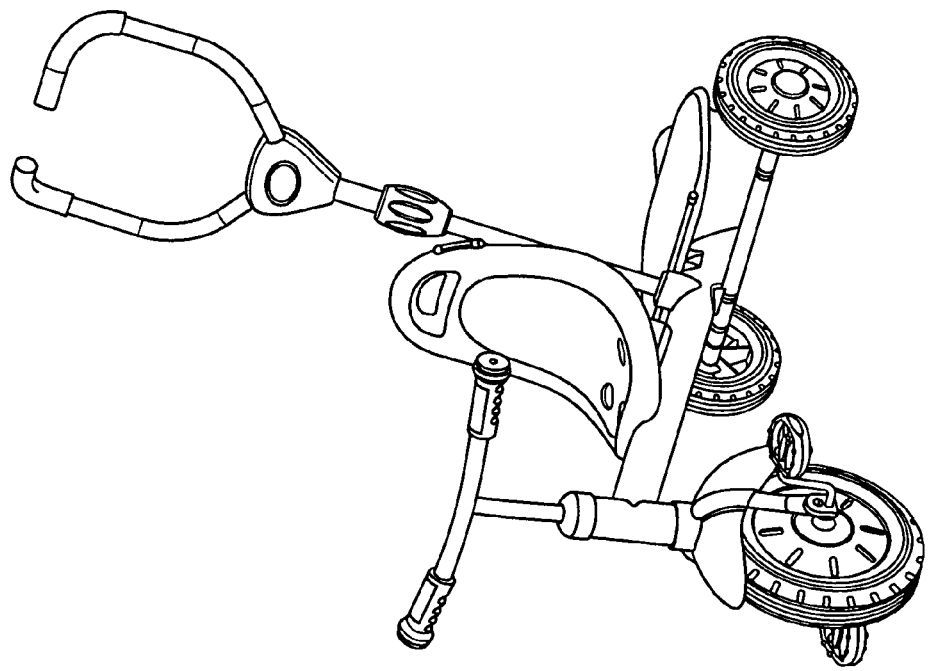
Figure 3A:
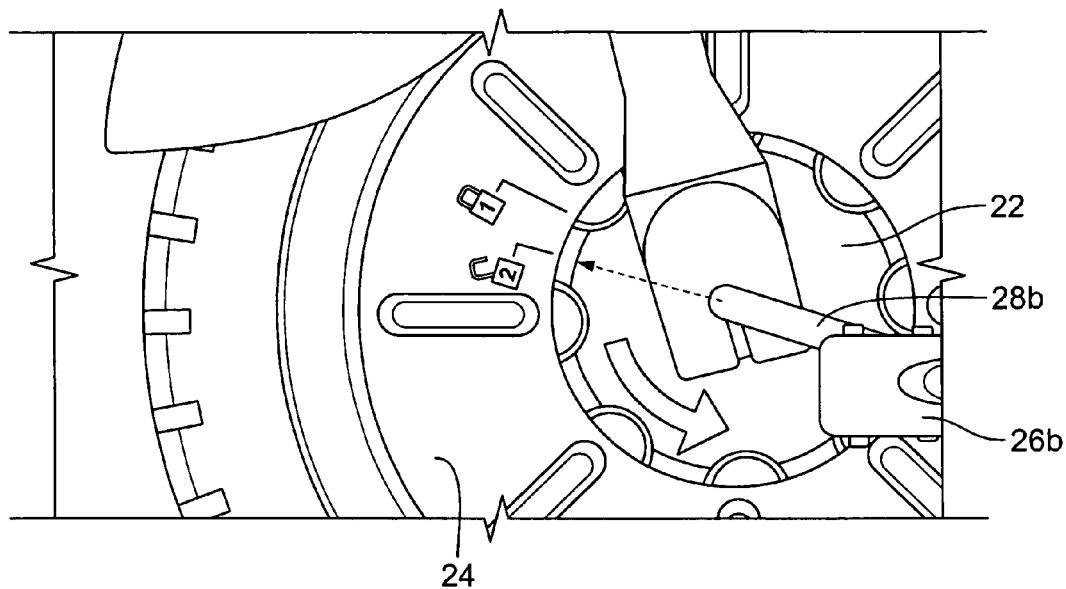
FIGS. 3A and 3B are partial perspective views illustrating operation of the front hub of the tricycle of FIGS. 1-2B.
Figure 3B:
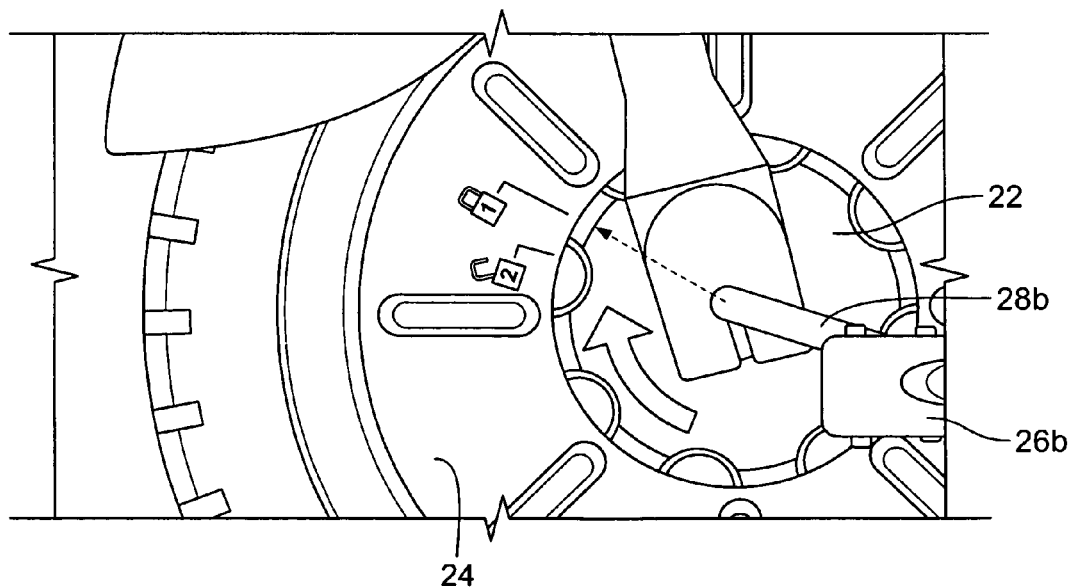

The tricycle of FIGS. 1-2D is equipped with a clutch mechanism that may be locked or unlocked to allow the pedals to freewheel. More specifically, as illustrated in FIGS. 1, 3A and 3B, the front hub 22 of the tricycle may be pivoted with respect to the front wheel 24 between an unlocked configuration, illustrated in FIG. 3A, and an locked configuration, illustrated in FIG. 3B. When in the unlocked configuration, the pedals are disengaged from the front wheel of the tricycle so that the pedals 26a and 26b and cranks 28a and 28b do not rotate when the tricycle is pushed by a parent. Furthermore, when the pedals are unlocked (FIG. 3A), no power is transferred to the front wheel via the pedals and cranks even if the child riding the tricycle rotates the pedals in the forward direction with his feet. As a result, the pedals are essentially "turned-off."

Alternatively, when the pedals are locked (FIG. 3B), the clutch mechanism operates so that the front wheel freewheels or rotates independently of the pedals and cranks if the child rests his or her feet or pedals backwards as the tricycle moves forward when being pushed by a parent or the like or traveling down an inclined surface. When the child rider rotates the pedals forward, however, the cranks operate to turn the front wheel so that the child's pedaling action powers the front wheel.

The locking and unlocking front hub allows the pedals to serve as footrests when the tricycle is used as a stroller and, when in the locked configuration, is also good for children learning how to pedal.

Figure 4A:
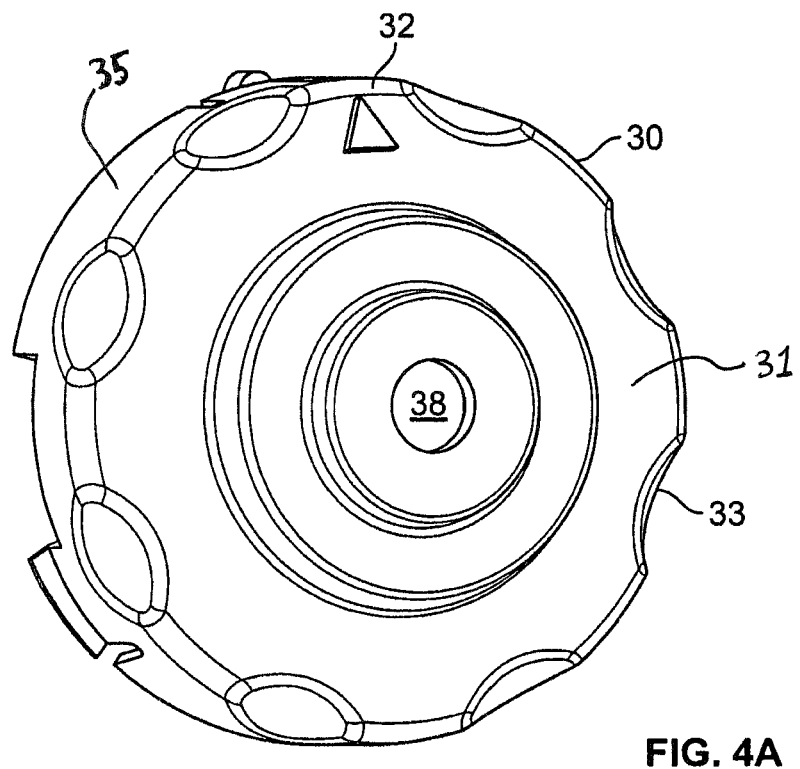
FIGS. 4A and 4B are enlarged views of the exterior and interior of the hub cover of a first embodiment of the hub of the tricycle of FIGS. 1-3B.
Figure 4B:
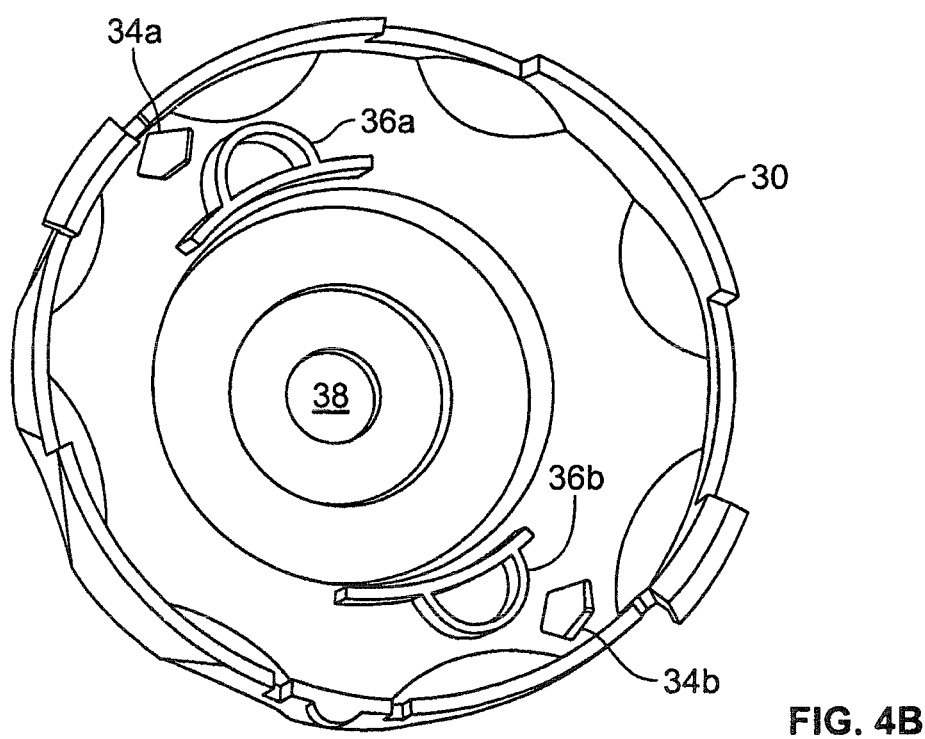

A first embodiment of the front wheel hub 22 of FIGS. 3A and 3B is presented in FIGS. 4A through 9C. The exterior surface of the hub cover 30 is illustrated in FIG. 4A, while the interior is illustrated in FIG. 4B. As illustrated in FIG. 4A, the exterior surface of the cover 30 includes a face portion 31 with a dial indicator in the form of arrow 32 and finger notches 33 for turning the hub between the unlocked and locked configurations (as illustrated in FIGS. 3A and 3B). As further shown in FIG. 4A, a flange 35 extends from the periphery of the face portion 31 of the exterior surface of the cover 30. As shown in FIG. 4B, the interior of the cover includes a pair of elongated rib protrusions 34 a and 34 b (spaced 180 degrees apart) and a pair of arch protrusions 36 a and 36 b (spaced 180 degrees apart). The pedal crank passes through central opening 38.

The internal components of the hub are illustrated in FIGS. 5 and 6. A ratchet 42 is welded to the pedal cranks (28a and 28b of FIG. 1). The toothed ratchet wheel 42 is rotatably positioned between a pair of mounting plates 44a and 44b. The mounting plates are secured in spaced relation by spacer pins 46. Clutch dogs 48a and 48b are pivotally mounted between the mounting plates by two of the pins. Rubber washers 50a and 50b are position on each side of each dog (total of four rubber washers) to dampen vibration and sound as the dogs operate as described below.

Figure 7A:
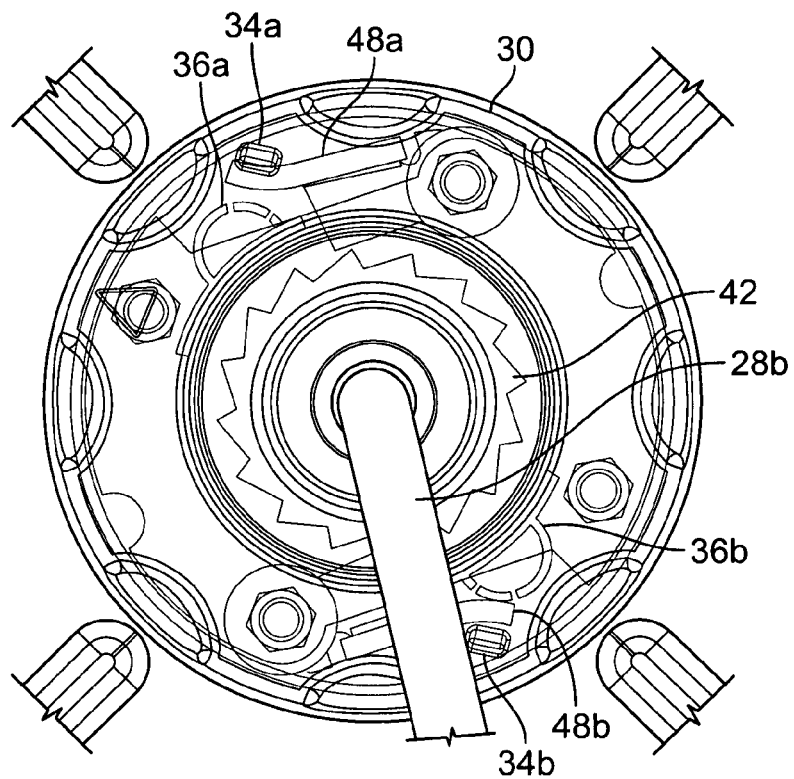
FIGS. 7A and 7B are side elevational views of the hub of FIGS. 4A-6 with the hub cover shown as transparent illustrating operation of the hub.
Figure 7B:
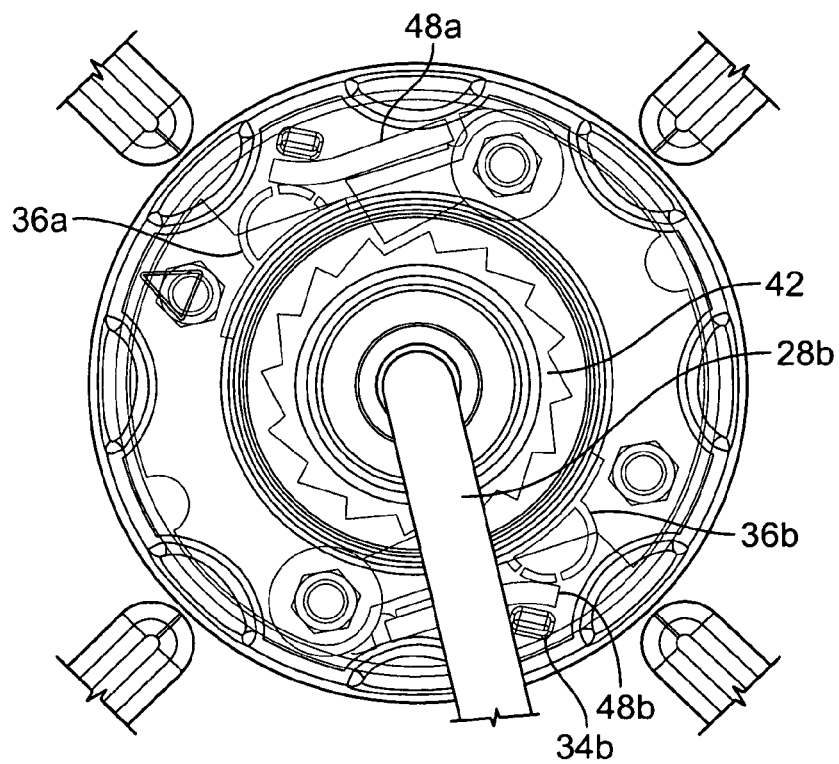

FIGS. 7A and 7B show the operation of the front hub of FIGS. 4A-6 when in the locked configuration (FIG. 3B). When in the locked configuration, the arch protrusions 36a and 36b are positioned relative to the clutch dogs 48a and 48b as shown in FIGS. 7A and 7B. As the pedal cranks (28b shown in FIGS. 7A and 7B) are turned counter clockwise, i.e. in the reverse direction for the child rider, the teeth of the ratchet wheel 42 pass below the clutch dogs 48a and 48b and cause the clutch dogs to pivot clockwise. FIG. 7A illustrates the clutch dogs during their "upstroke" as they travel up a tooth on the ratchet wheel 42, while FIG. 7B illustrates the clutch dogs during their "downstroke" after passing over the peak of the tooth. During their upstroke (FIG. 7A), the clutch dogs contact their corresponding elongated rib protrusions 34a and 34b so that their clockwise travel is limited and they are urged back down in a counterclockwise pivoting motion towards the ratchet wheel. As illustrated in FIG. 7B, as the clutch dogs rebound back towards the ratchet wheel, they contact the arch protrusions 36a and 36b to prevent bottoming out on the ratchet wheel 42. This reduces the noise level of the operation of the hub.

When the pedals of the tricycle, and thus the pedal cranks (28b in FIGS. 7A and 7B) are rotated in the forward direction by the child rider (clockwise in FIGS. 7A and 7B) the clutch dogs engage the teeth of the ratchet wheel 42 (FIG. 7B) and the tricycle is propelled forward.

Figure 8:
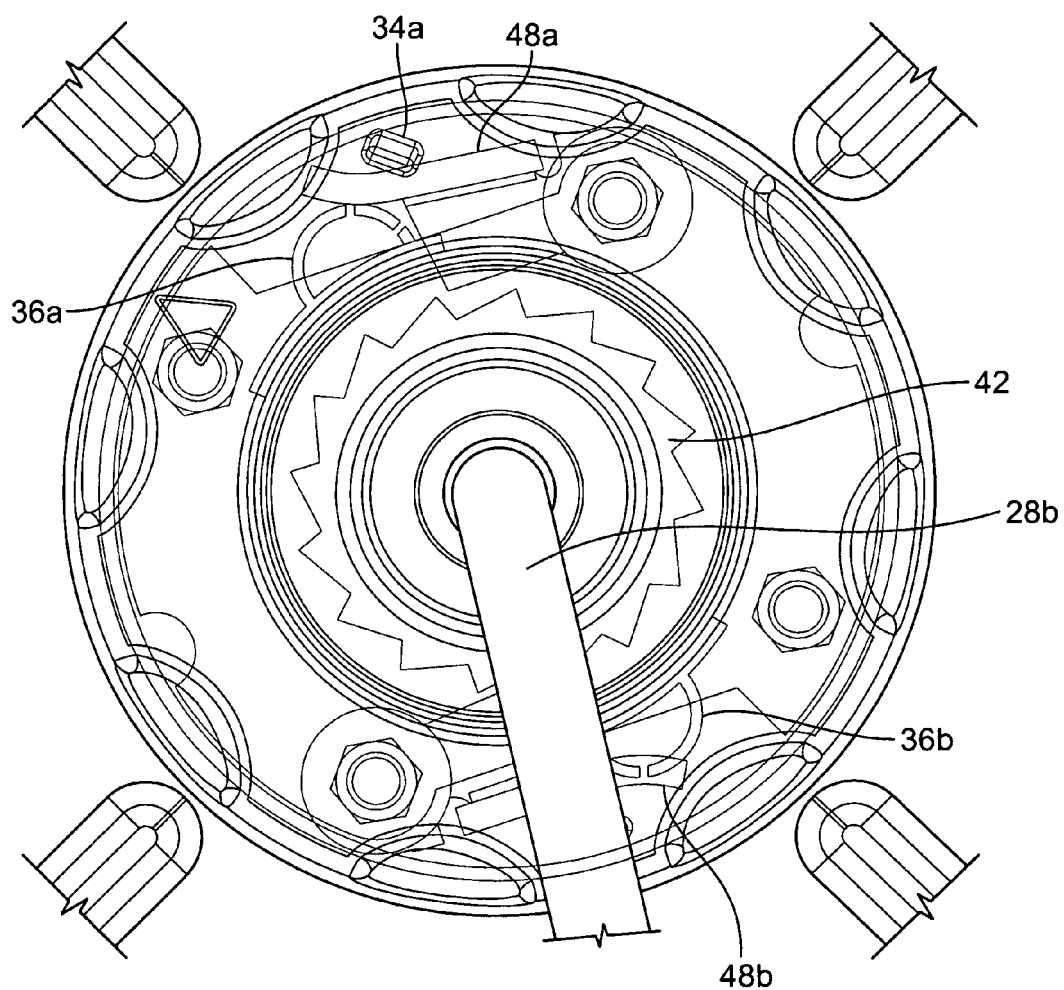
FIG. 8 is a side elevational view of the hub of FIGS. 7A and 7B with the hub cover shown as transparent illustrating operation of the hub.

The position of the arch protrusions 36a and 36b relative to the clutch dogs 48a and 48b when the hub is in the unlocked configuration (FIG. 3A) are illustrated in FIG. 8. More specifically, as compared to the locked configuration of FIGS. 7A and 7B, the arch protrusions 36a and 36b have been rotated closer to the clutch dogs 48a and 48b. As a result, the arch protrusions 36a and 36b engage the clutch dogs 48a and 48b and secure them in the positions illustrated in FIG. 8. The teeth of the ratchet wheel 42 do not contact or engage the clutch dogs when in this configuration and thus by movement of the pedals and pedal cranks (28b in FIG. 8) by the child rider in either direction does not result in movement of the front wheel of the tricycle. In other words, movement of the pedals and cranks is independent of movement of the tricycle front wheel when the hub is in this unlocked configuration.

Figure 9A:
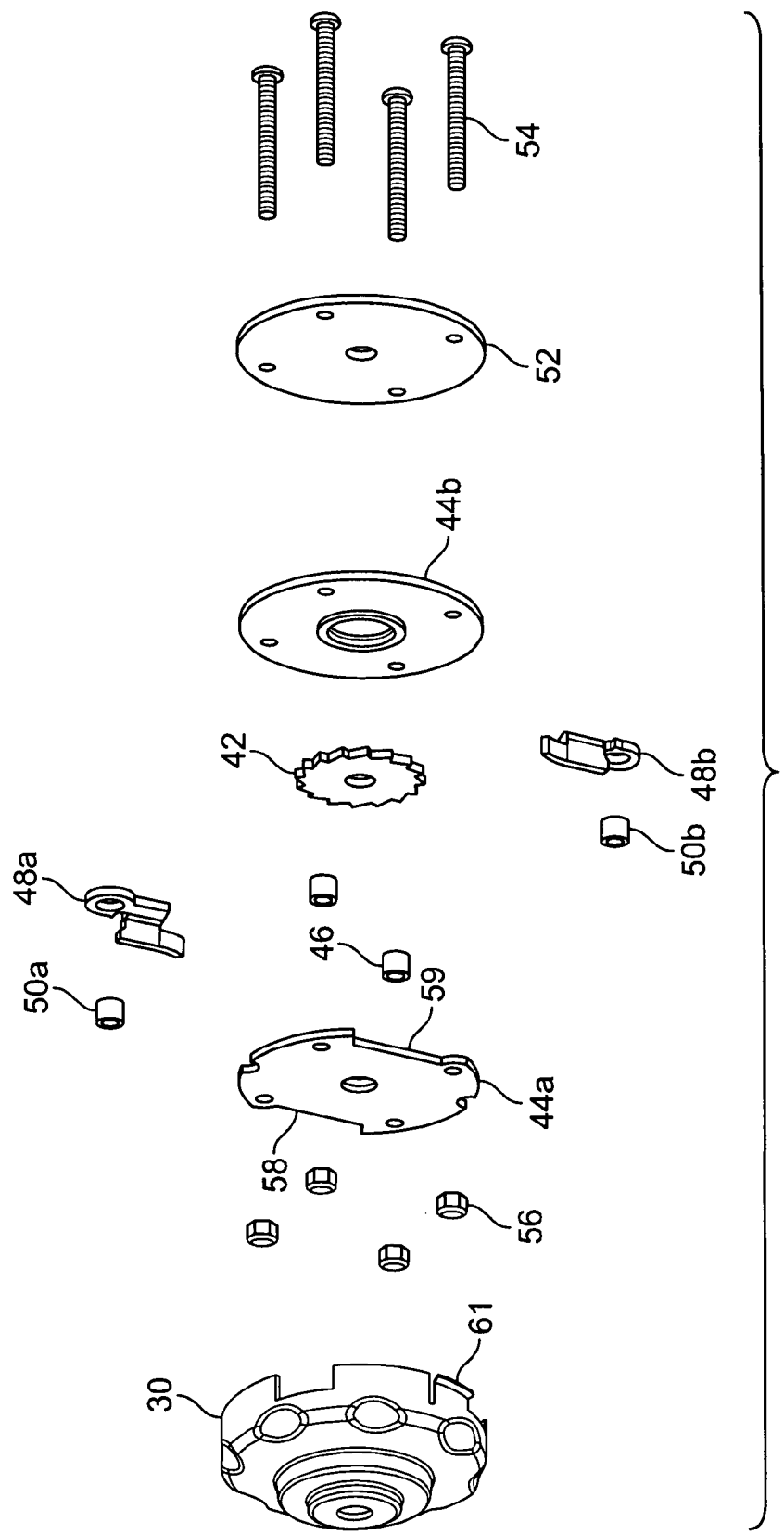
FIG. 9A is an exploded view of the hub of FIGS. 4A-7B.

An exploded view of the front hub of FIGS. 4A-8 is provided in FIG. 9A. In addition to the components described above, a cover disk 52 is illustrated. The cover disk is secured to the mounting plate 44b with the tricycle wheel sandwiched there between. More specifically, with reference to FIGS. 9B and 9C, the wheel of the tricycle 24 is provided with a tire 61 and features a central opening 65 which is surrounded by annular recesses 63a and 63b on both sides of the wheel. The annular recesses feature bolt holes 53. As illustrated in FIG. 9C, the cover disk 52 fits within the annular recess 63b on one side of the wheel. Bolts 54 (FIG. 9A) then pass through the bolt holes of the cover disk 52 and bolt holes 53 of the annular recesses. Mounting plate 44b is then positioned within the annular recess 63a (FIG. 9B) with the bolts 54 (FIG. 9A) passing through its four bolt holes.

The remaining components of FIG. 9A, with the exception of hub cover 30, are sandwiched between mounting plates 44a and 44b. The assembly is secured together by the bolts 54 which are engaged by nuts 56. The flat sides 58 and 59 of the mounting plate 44a permit the elongated rib and arch protrusions formed in the interior of the cover 30 to engage the clutch dogs as described above when the hub cover is assembled to the remainder of the assembly. The hub cover 30 features tabs 61 (FIG. 9A) that engage corresponding slots 63 (FIG. 9B) formed in wheel 24. Slots 63 are elongated so that the hub cover may move between the locked and unlocked positions in the manner illustrated in FIGS. 7A, 7B and 8.

Figure 10A:
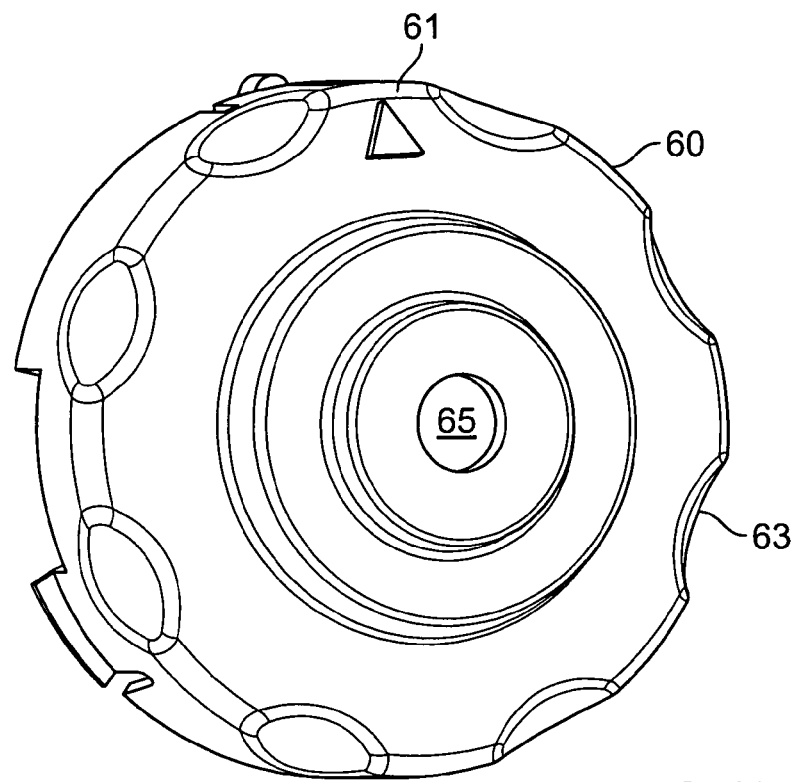
FIGS. 10A and 10B are enlarged views of the exterior and interior of the hub cover of a second embodiment of the hub of the tricycle of FIGS. 1-3B.
Figure 10B:
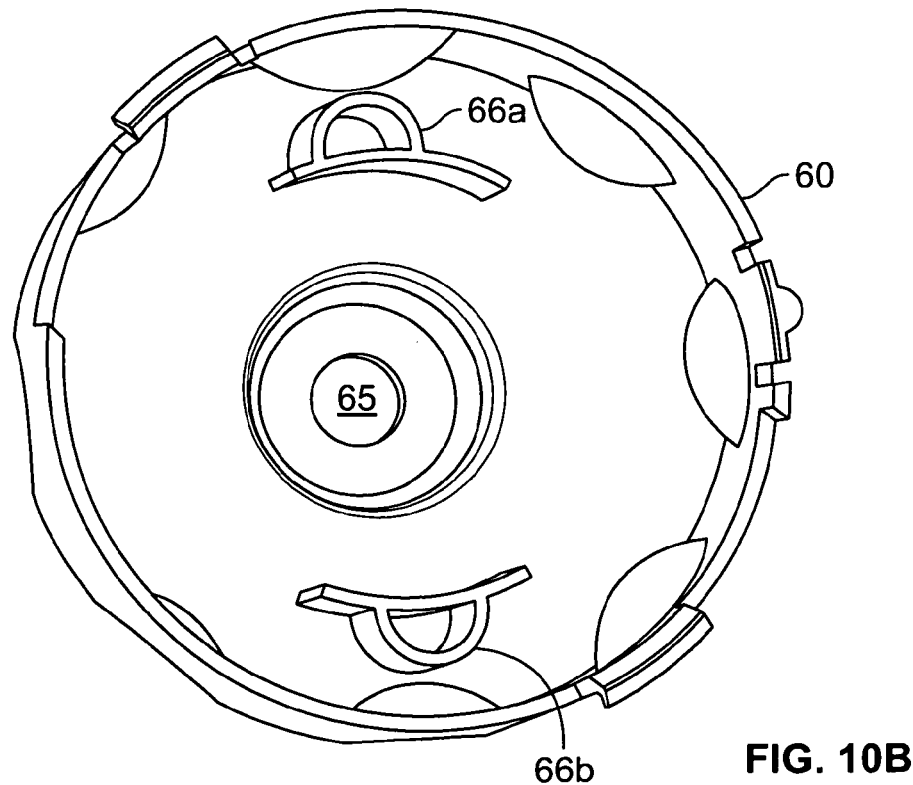

A second embodiment of the front wheel hub 22 of FIGS. 3A and 3B is presented in FIGS. 10A through 15. The exterior surface of the hub cover 60 is illustrated in FIG. 10A, while the interior is illustrated in FIG. 10B. As illustrated in FIG. 10A, the exterior surface of the cover 60 includes a dial indicator in the form of arrow 61 and finger notches 63 for turning the hub between the unlocked and locked configurations (as illustrated in FIGS. 3A and 3B). As shown in FIG. 10B, the interior of the cover includes a pair of arch protrusions 66a and 66b (spaced 180 degrees apart). The pedal crank passes through central opening 65.

Figure 11:
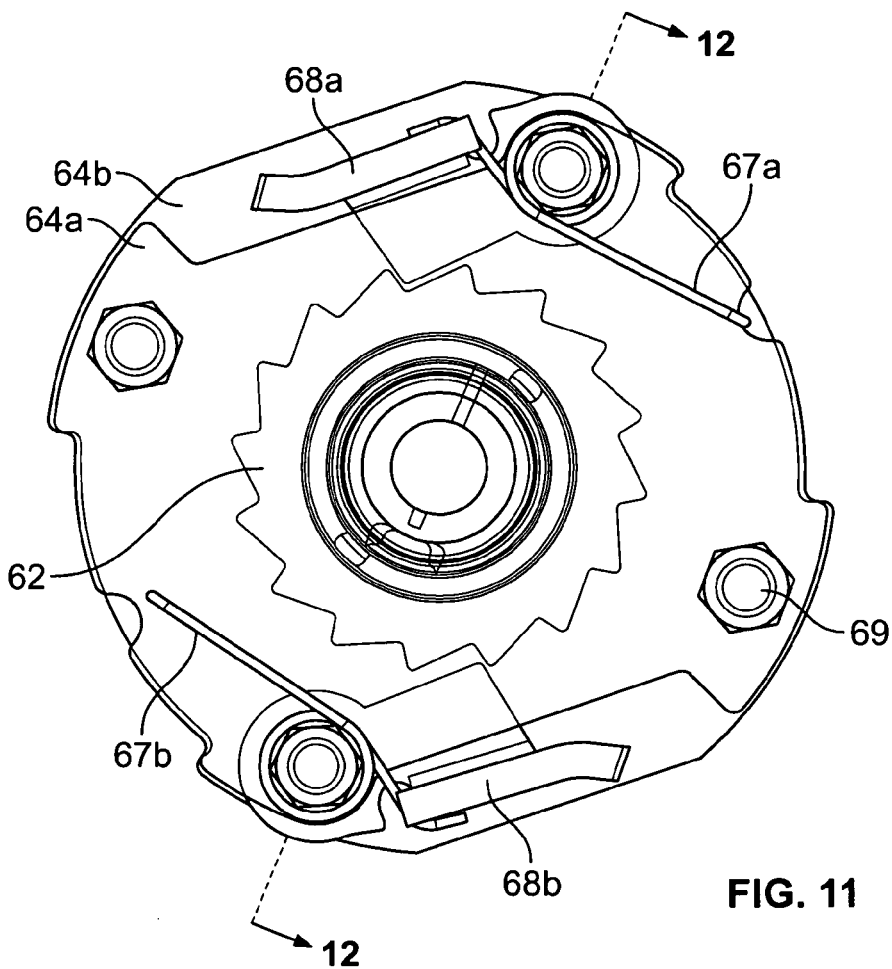
FIG. 11 is a side elevational view of the internal components in the second embodiment of the hub of the tricycle of FIGS. 1-3B with one of the mounting plates removed.
Figure 12:
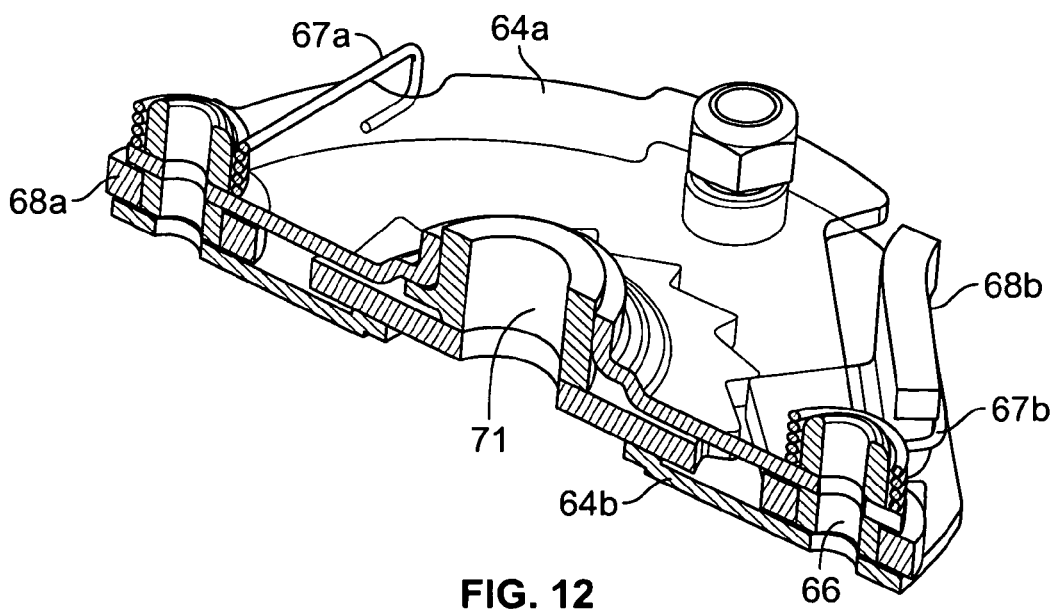
FIG. 12 is a cross sectional view of the internal components of the hub and both mounting plates taken along line 12-12 of FIG. 11.

The internal components of the hub are illustrated in FIGS. 11 and 12. A ratchet 62 is welded to the pedal cranks (28a and 28b of FIG. 1). The toothed ratchet wheel 62 is rotatably positioned between a pair of mounting plates 64a and 64b. The mounting plates are secured in spaced relation by spacer pins 69. Clutch dogs 68a and 68b are pivotally mounted between the mounting plates by two of the pins. Torsion springs 67a and 67b are also mounted between the mounting plates by two of the pins and each features one end that engages mounting plate 64a and another end that engages a corresponding clutch dog. The torsion springs urge the clutch dogs towards the ratchet wheel 62 as will be explained below. A plastic bushing 71 prevents rubbing between the pedal crank and the mounting plate 64a.

Figure 13A:
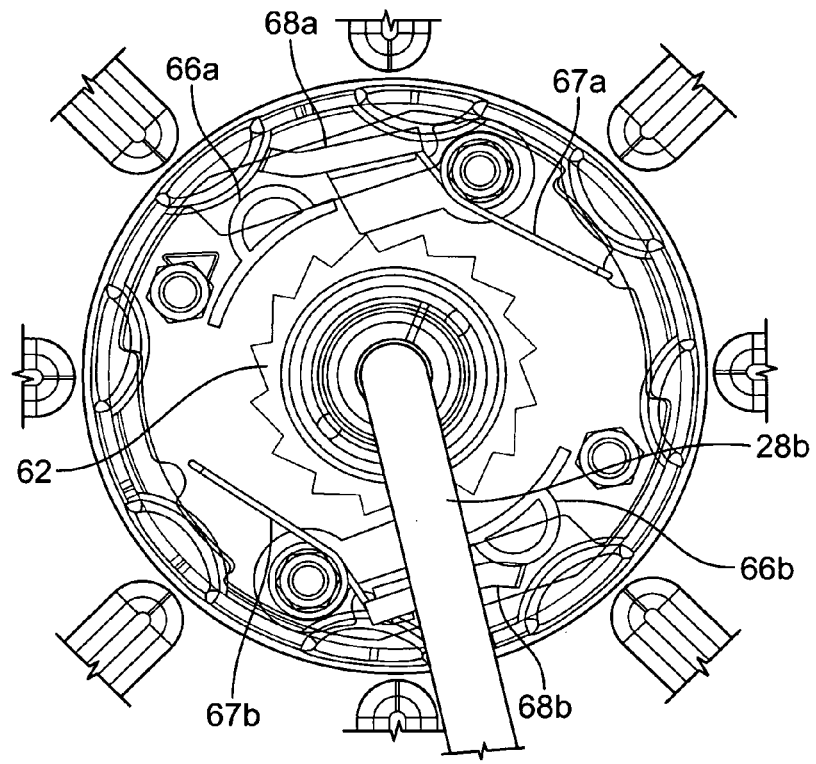
FIGS. 13A and 13B are side elevational views of the hub of FIGS. 10A-12 with the hub cover shown as transparent illustrating operation of the hub.
Figure 13B:
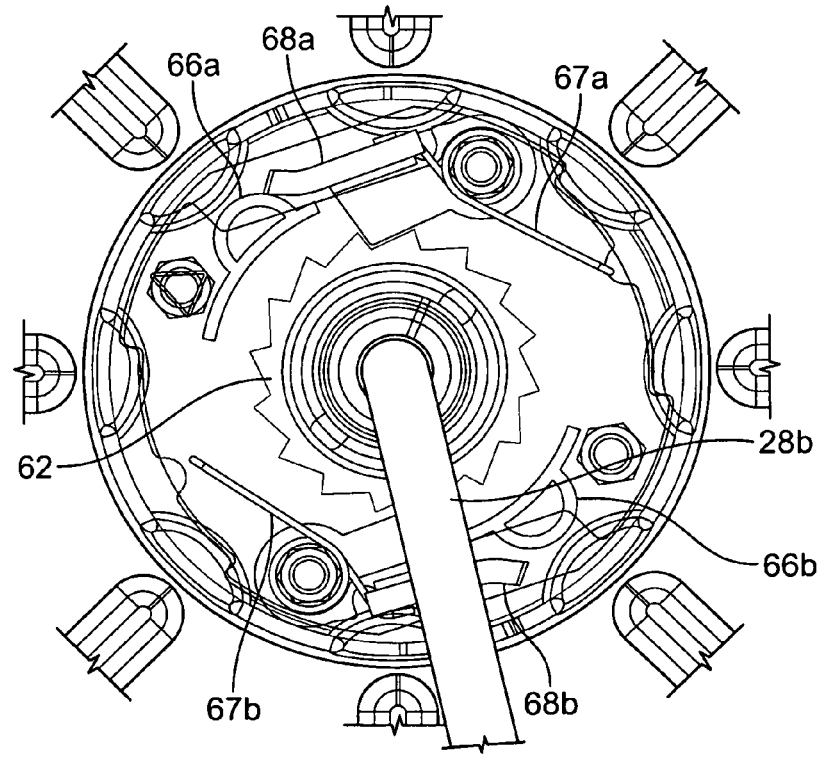

FIGS. 13A and 13B show the operation of the front hub of FIGS. 10A-12 when in the locked configuration (FIG. 3B). When in the locked configuration, the arch protrusions 66a and 66b are positioned relative to the clutch dogs 68a and 68b as shown in FIGS. 13A and 13B. As the pedal cranks (28b shown in FIGS. 13A and 13B) are turned counter clockwise, i.e. in the reverse direction for the child rider, the teeth of the ratchet wheel 62 pass below the clutch dogs 68a and 68b and cause the clutch dogs to pivot clockwise. FIG. 13A illustrates the clutch dogs during their "upstroke" as they travel up a tooth on the ratchet wheel 62, while FIG. 13B illustrates the clutch dogs during their "downstroke" after passing over the peak of the tooth. The clutch dogs are urged by their corresponding torsion springs to contact the ratchet wheel 62. As illustrated in FIG. 13B, as the clutch dogs rebound back towards the ratchet wheel, they contact the arch protrusions 66a and 66b to prevent bottoming out on the ratchet wheel 62. This reduces the noise level of the operation of the hub.

When the pedals of the tricycle, and thus the pedal cranks (28b in FIGS. 13A and 13B) are rotated in the forward direction by the child rider (clockwise in FIGS. 13A and 13B) the clutch dogs engage the teeth of the ratchet wheel 62 (FIG. 13B) and the tricycle is propelled forward.

Figure 14:
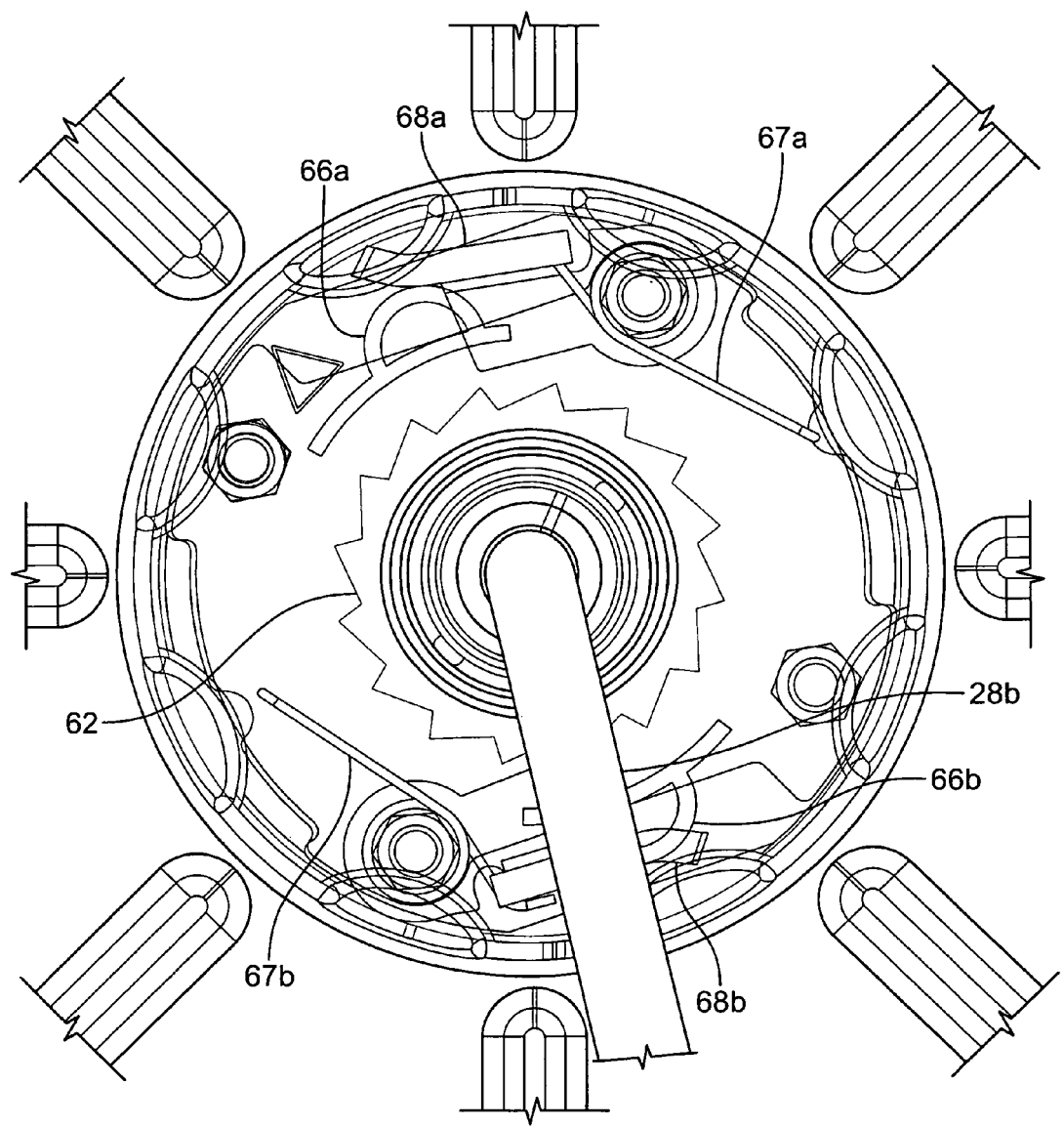
FIG. 14 is a side elevational view of the hub of FIGS. 13A and 13B with the hub cover shown as transparent illustrating operation of the hub.
Figure 15:
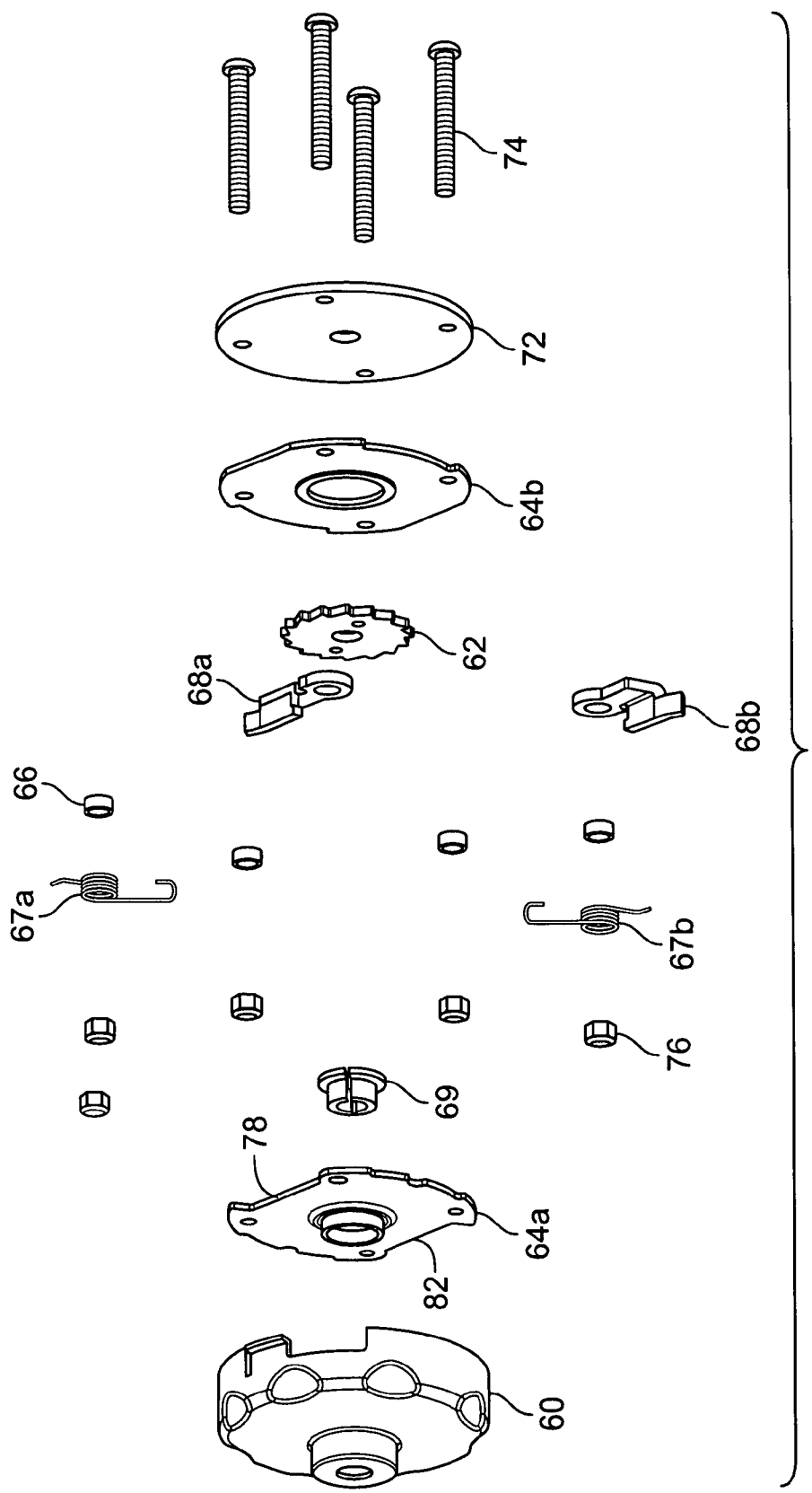
FIG. 15 is an exploded view of the hub of FIGS. 10A-14.

The position of the arch protrusions 66a and 66b relative to the clutch dogs 68a and 68b when the hub is in the unlocked configuration (FIG. 3A) are illustrated in FIG. 14. More specifically, as compared to the locked configuration of FIGS. 13A and 13B, the arch protrusions 66a and 66b have been rotated closer to the clutch dogs 68a and 68b. As a result, the arch protrusions 66a and 66b engage the clutch dogs 68a and 68b and secure them in the positions illustrated in FIG. 14 against the urging of torsion springs 67a and 67b. The teeth of the ratchet wheel 62 do not contact or engage the clutch dogs when in this configuration and thus movement of the pedals and pedal cranks (28b in FIG. 14) by the child rider in either direction does not result in movement of the front wheel of the tricycle. In other words, movement of the pedals and cranks is independent of movement of the tricycle front wheel when the hub is in this unlocked configuration.

Figure 9B:
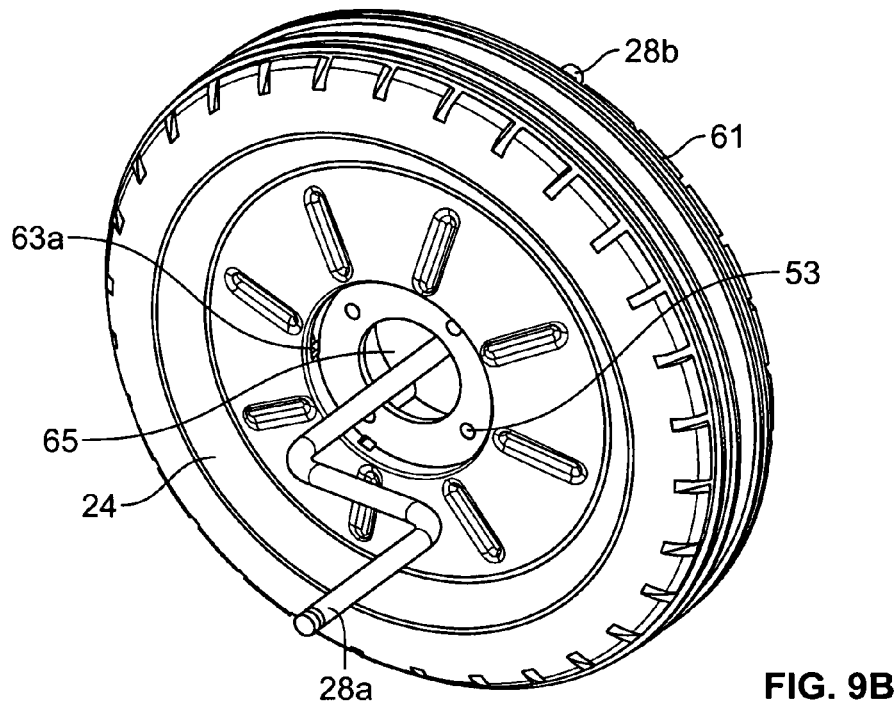
FIGS. 9B and 9C are perspective views of each side of the front wheel and tire of the tricycle of FIGS. 1-9A.
Figure 9C:
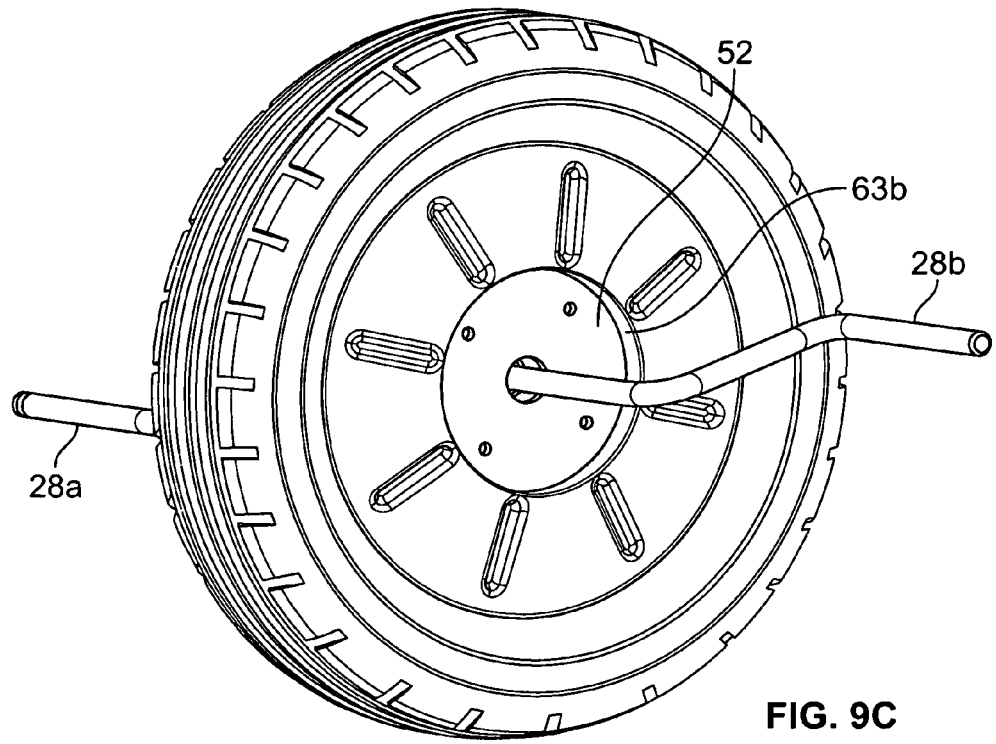

An exploded view of the front hub of FIGS. 10A-14 is provided in FIG. 9. In addition to the components described above, a cover disk 72 is illustrated. The cover disk is secured to the mounting plate 64b with the wheel of the tricycle sandwiched there between (as described above with respect to FIGS. 9B and 9C). The remaining components of FIG. 15, with the exception of hub cover 50, are sandwiched between mounting plates 54a and 54b. The assembly is secured together by bolts 74 which are engaged by nuts 76. The flat sides 78 and 82 of the mounting plate 64a permit the arch protrusions formed in the interior of the cover 60 to engage the clutch dogs as described above when the hub cover is assembled to the remainder of the assembly.

Figures 16A, 16B:
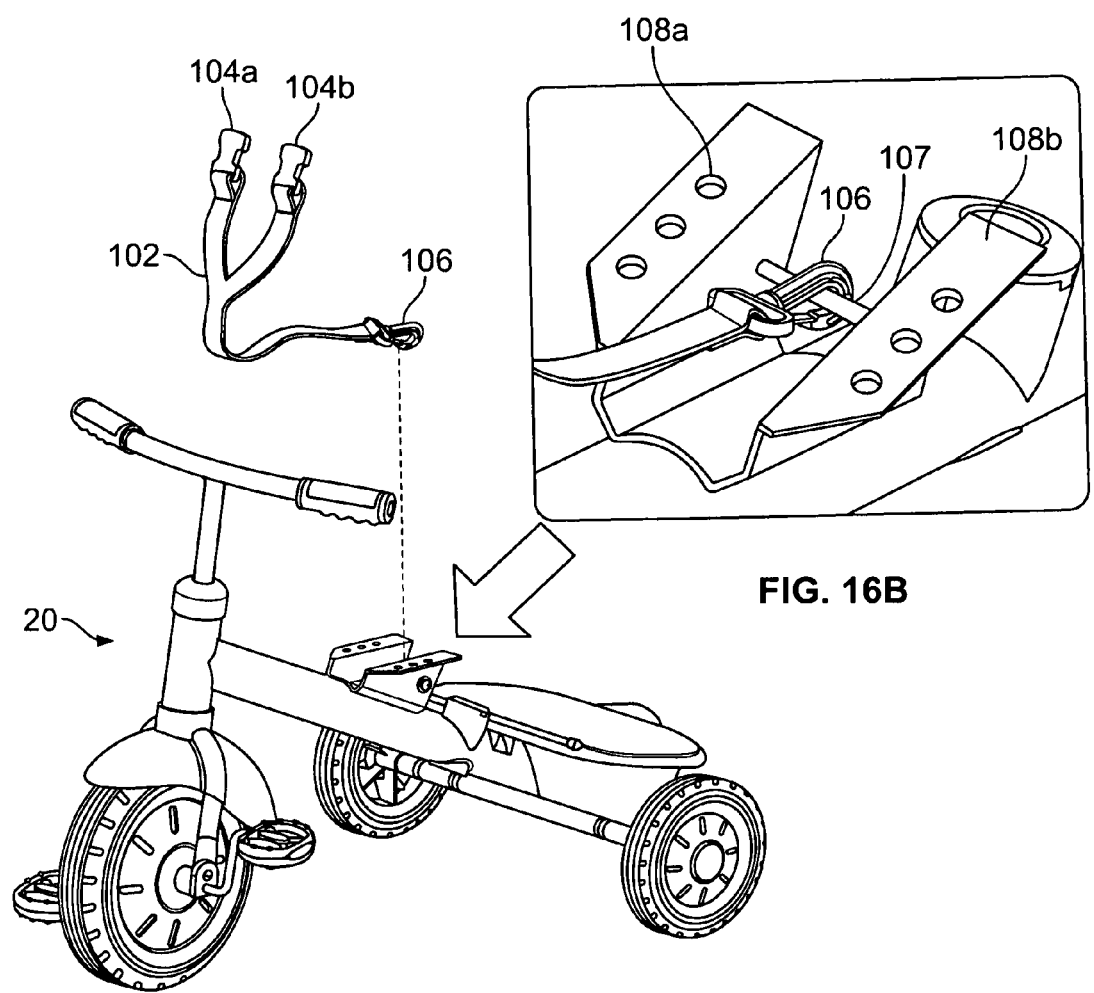
FIGS. 16A, 16B and 17A, 17B are perspective views illustrating installation of the safety strap of the tricycle of FIG. 1.

As illustrated in FIGS. 16A, 16B, 17A and 17B, the tricycle 20 is provided with a Y-shaped lower safety strap 102 featuring buckles 104a and 104b at the split end and a spring clip 106 at the opposite end. As illustrated in FIG. 16A, the spring clip 106 removably snaps into engagement with a rod 107 that passes between the opposing portions 108a and 108b of the seat mounting bracket. Other locations for rod 107 are possible.

Figures 17A, 17B:
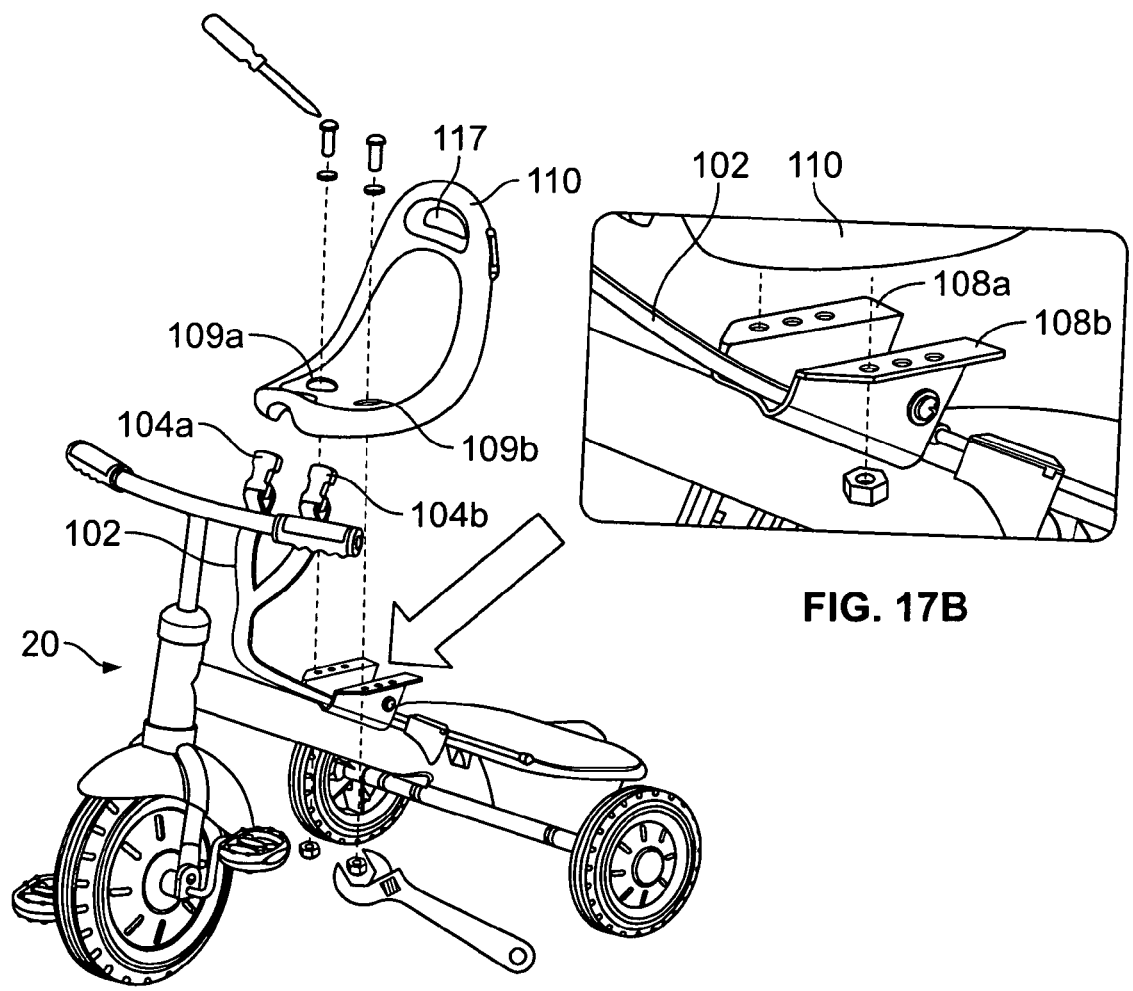

As illustrated in FIGS. 17A and 17B, the buckles 104a and 104b and the slit portion of the safety strap 102 pass through openings 109a and 109b of the tricycle seat 110, which is mounted upon the seat mounting bracket portions 108a and 108b.

As illustrated in FIGS. 18-23, the tricycle is provided with a removable headrest 112 that includes upper safety straps 116a and 116b that are provided with inserts 114a and 114b. Inserts 114a and 114b are adapted to engage buckles 104a and 104b of the lower safety strap of FIGS. 16A and 16B. The straps 116a and 116b pass through slots 118a and 118b of the headrest 112.

Figure 18:
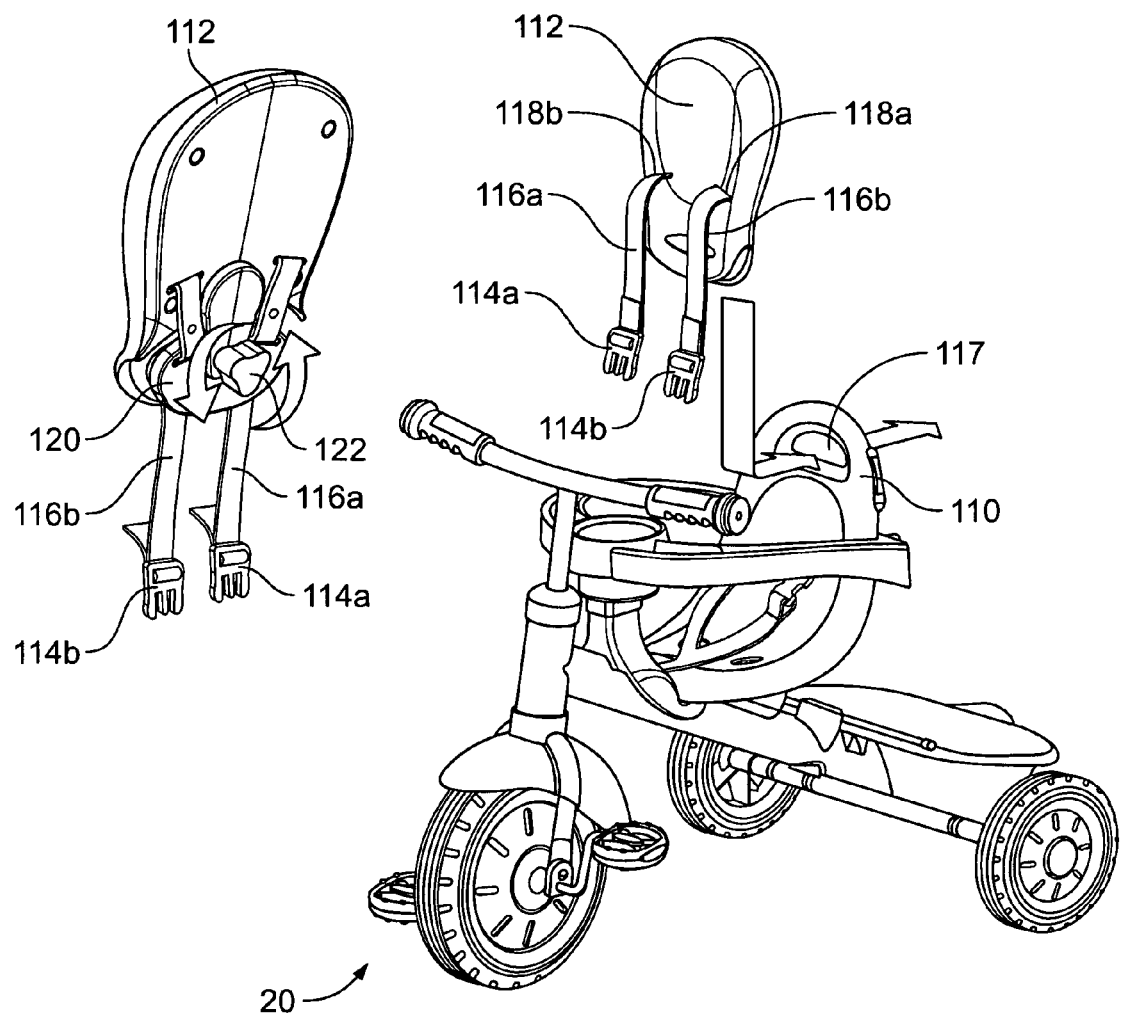
FIGS. 18-23 are perspective views showing installation of the headrest of the tricycle.
Figure 19:
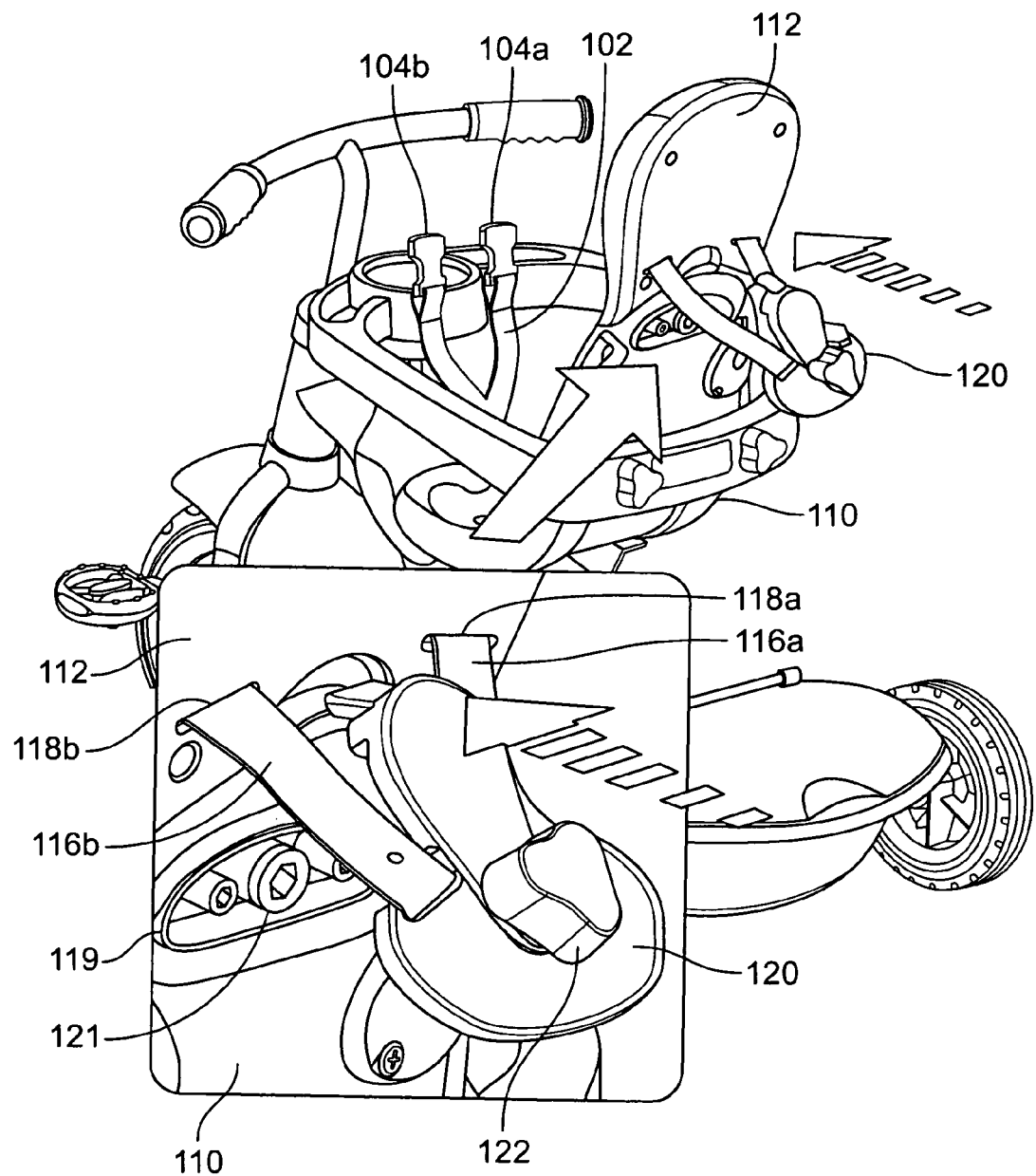
Figure 20:
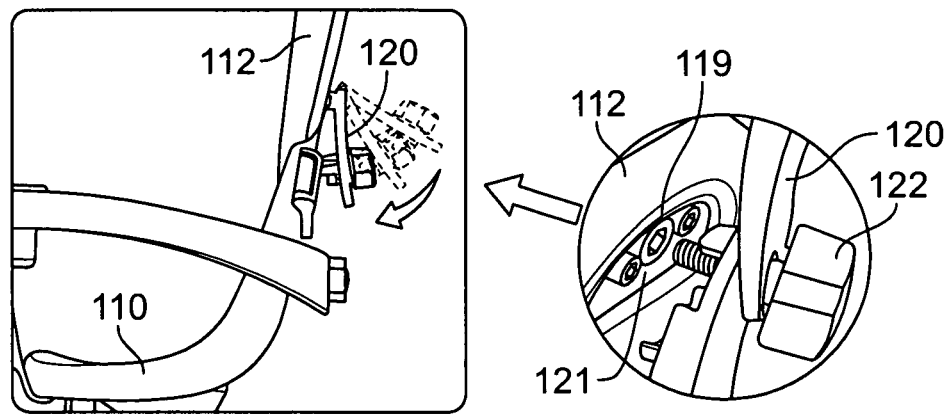
Figure 21:
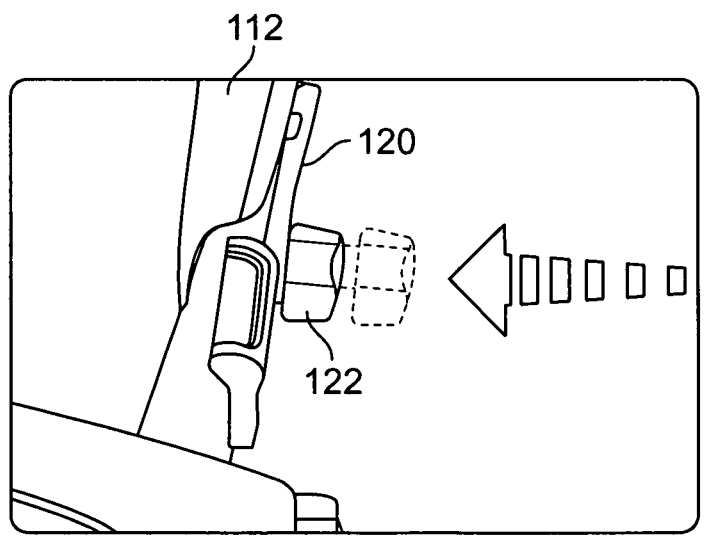
Figure 22:
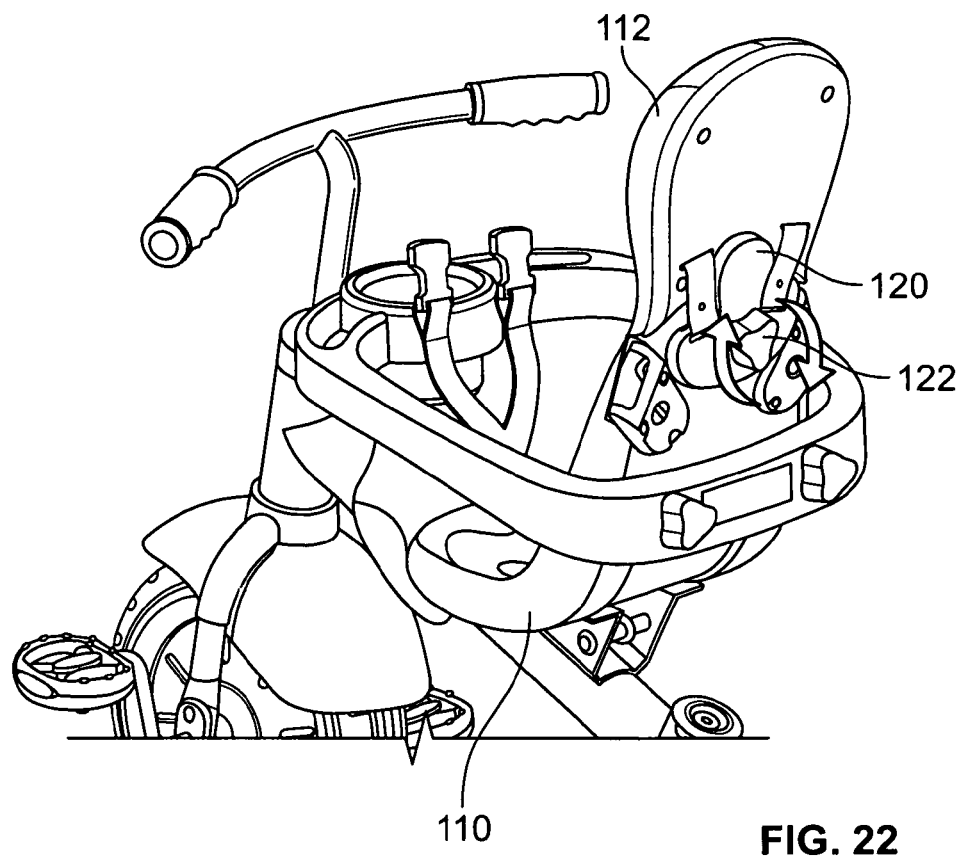
Figure 23:
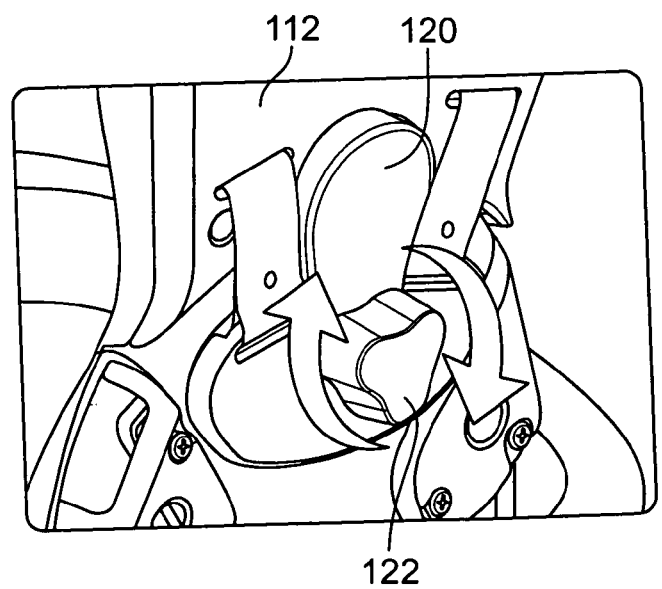
Figure 24B:
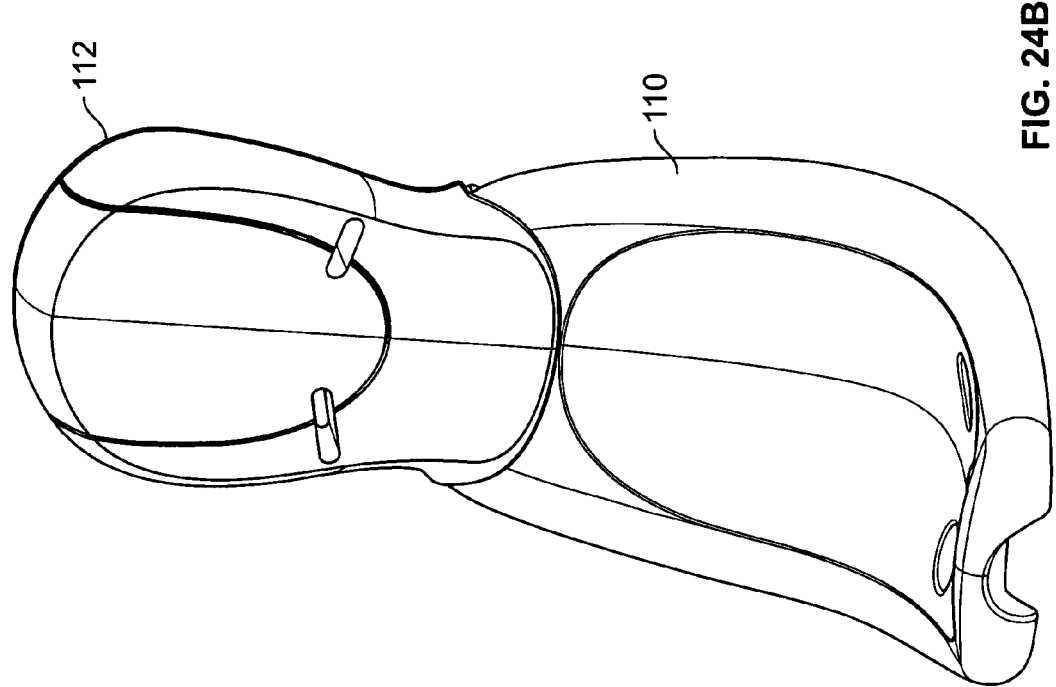
FIGS. 24A and 24B are front perspective views of the seat of the tricycle of FIG. 1 with the headrest removed and installed.
Figure 24A:
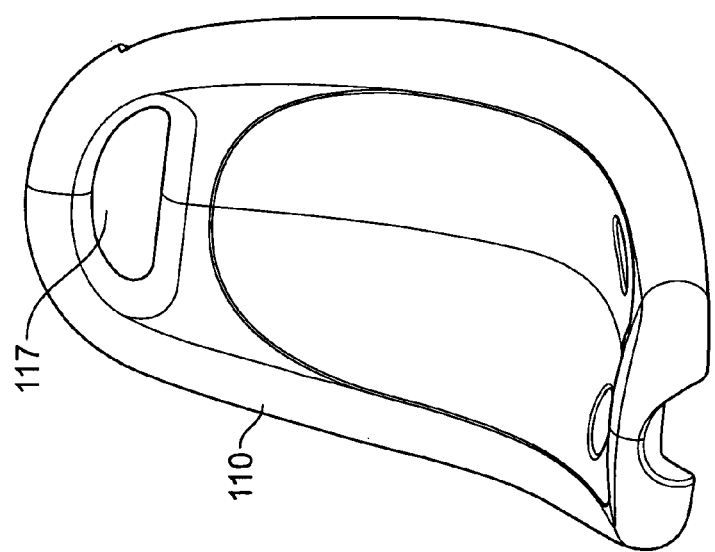
Figure 25B:
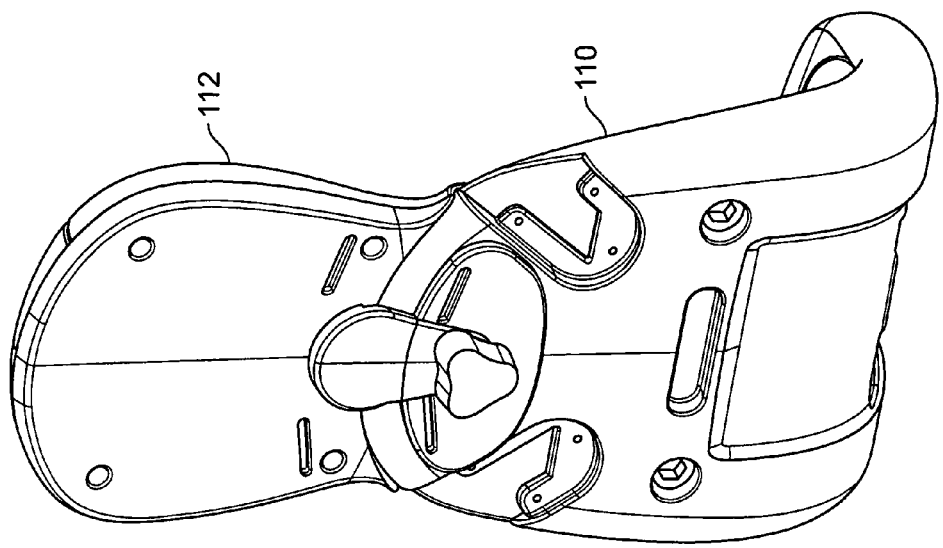
FIGS. 25A and 25B are rear perspective views of the seat of the tricycle of FIG. 1 with the headrest removed and installed.
Figure 25A:
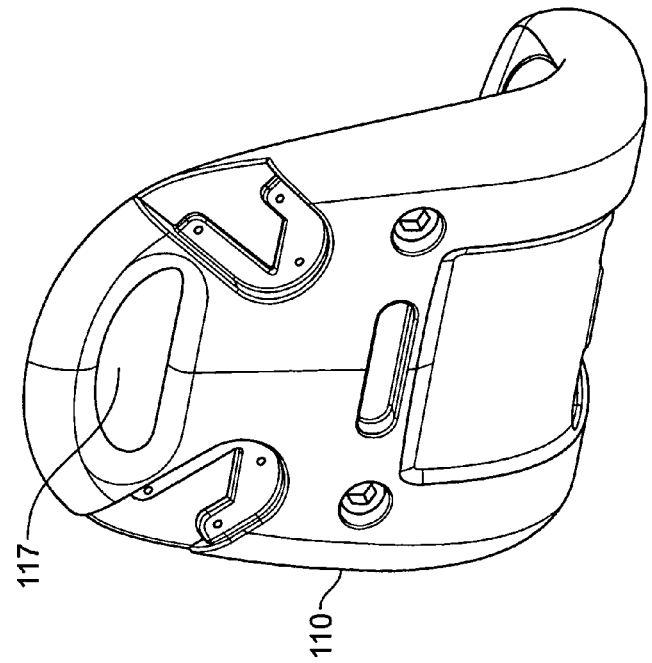

The headrest features a lower protrusion 119 (FIG. 19) that passes through the handle opening 117 of the back of tricycle seat 110. In addition, as illustrated in FIGS. 18 and 19, the lower portion of the headrest 112 is provided with a removable pressure plate 120 to which the upper safety strap 116a and 116b are fastened. The pressure plate 120 engages the lower protrusion 119 of the headrest passing through the opening in the seatback. More specifically, as illustrated in FIGS. 19 and 20, the lower protrusion 119 of the headrest is provided with a threaded bore 121 which receives a threaded knob 122 mounted through the pressure plate 120. As illustrated in FIGS. 21-23, after the lower protrusion of the headrest is positioned within the opening 117 of the seat 110, the threaded knob 122 of the pressure plate 120 is inserted into the treaded bore 121 of the headrest (FIG. 21) and the knob 122 is rotated in a clockwise direction (FIGS. 22 and 23) so that the threaded shaft engages the threaded bore and the headrest is secured to the seat. The headrest may be removed by reversing this procedure.

Figure 26B:
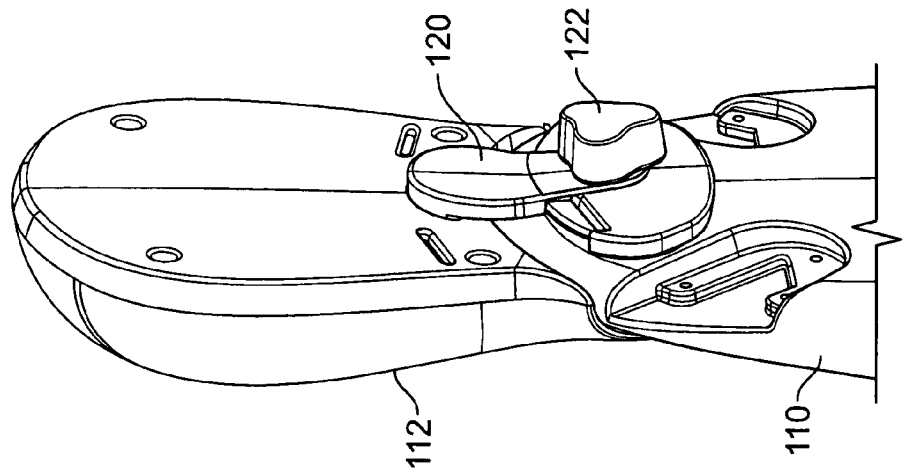
FIGS. 26A and 26B are rear perspective views of the seat and headrest of FIGS. 24A-25B showing installation of the headrest to the seat.
Figure 26A:
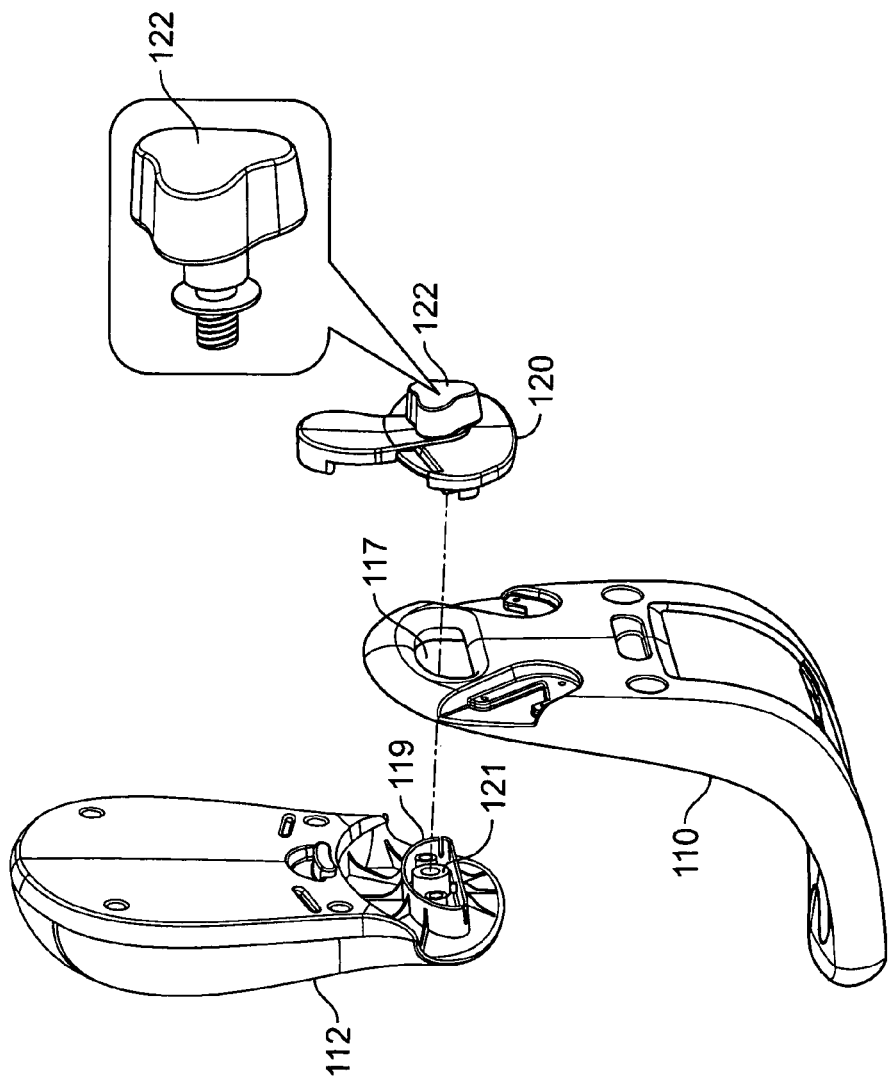

FIGS. 24A and 24B and 25A and 25B show front and back views of the tricycle seat 110 with the headrest 112 removed and installed, with the upper safety strap removed for clarity. FIGS. 26A and 26B also illustrate the installation of the headrest 112 to the seat 110 with the upper safety strap removed for clarity.

When the headrest 112 is installed the upper and lower safety straps 116a and 116b and 102 may be fastened together using the buckles 104a and 104b and inserts 114a and 114b so that a child may be safely secured in the seat 110 with the headrest 112 providing head and neck protection.

Figure 27:
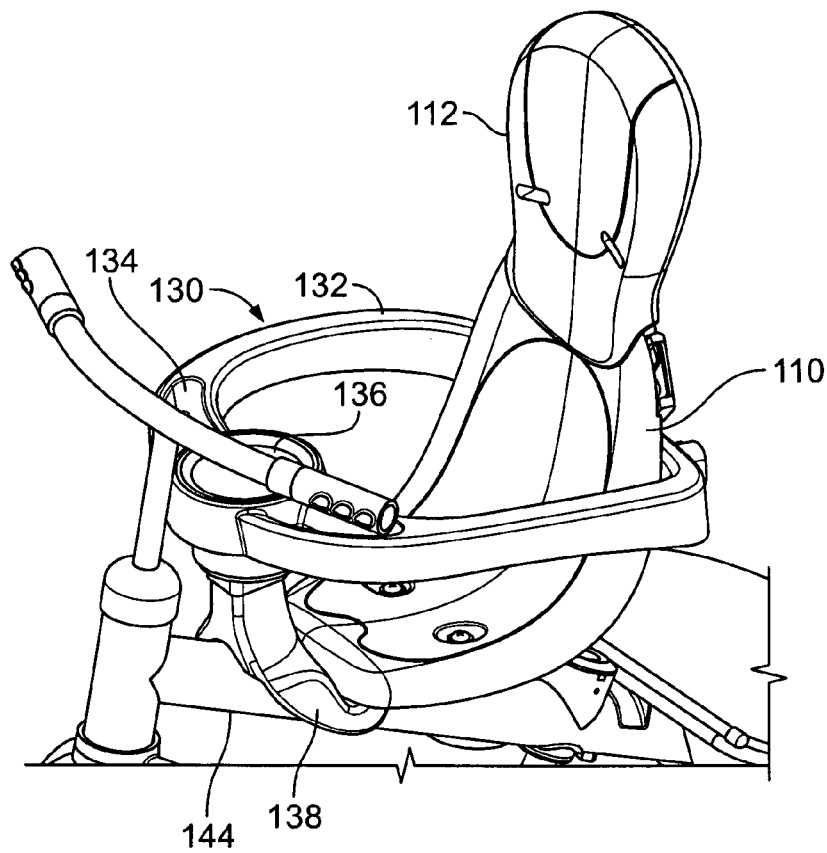
FIGS. 27-35 are perspective views illustrating installation of the safety arm and snack tray attachment of the tricycle of FIG. 1.
Figure 28:
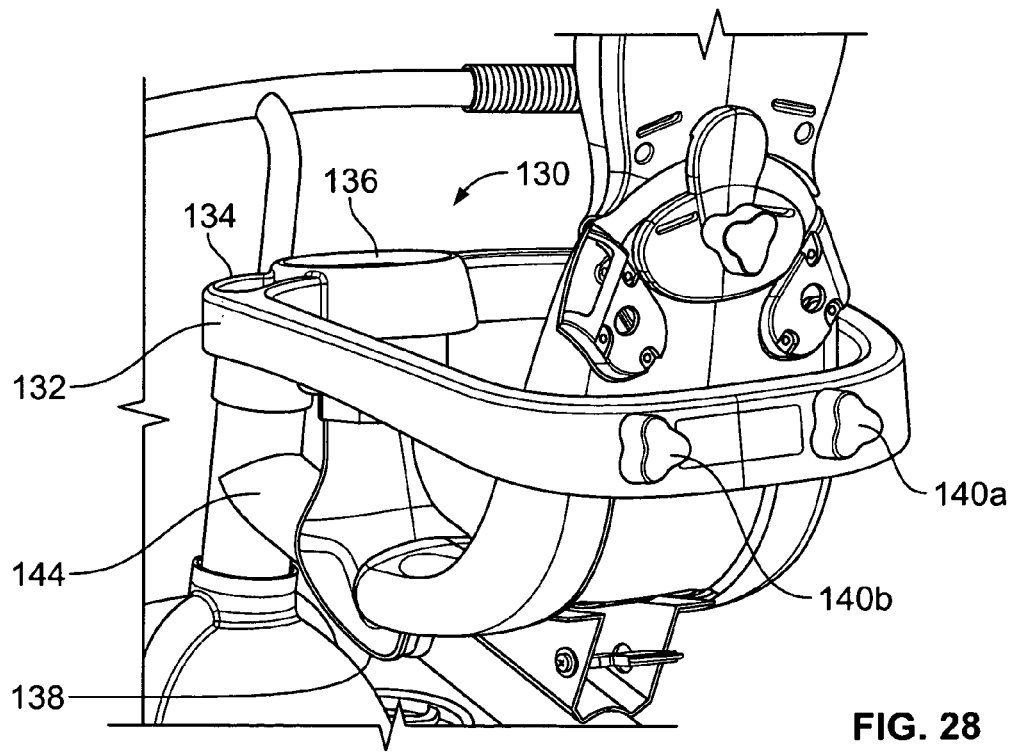
Figure 29:
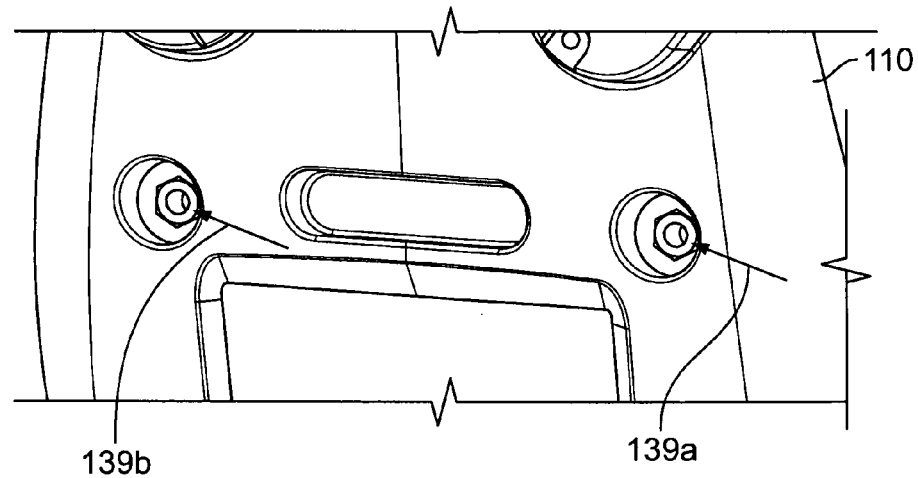
Figure 30:
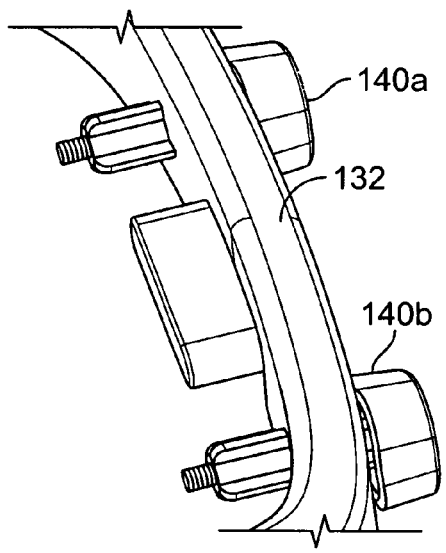
Figure 31:
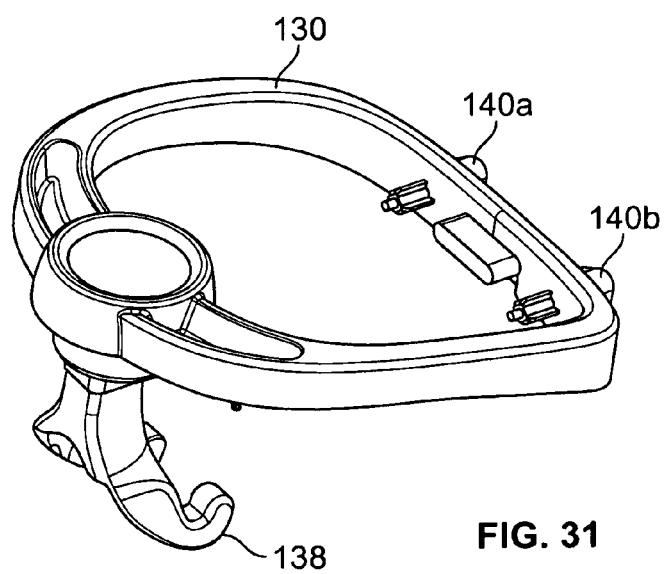
Figure 32:
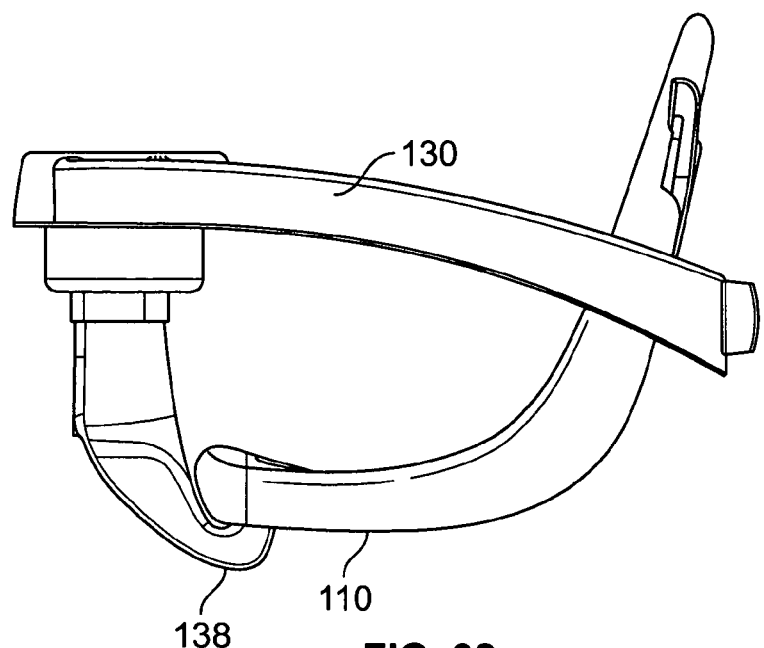
Figure 33:
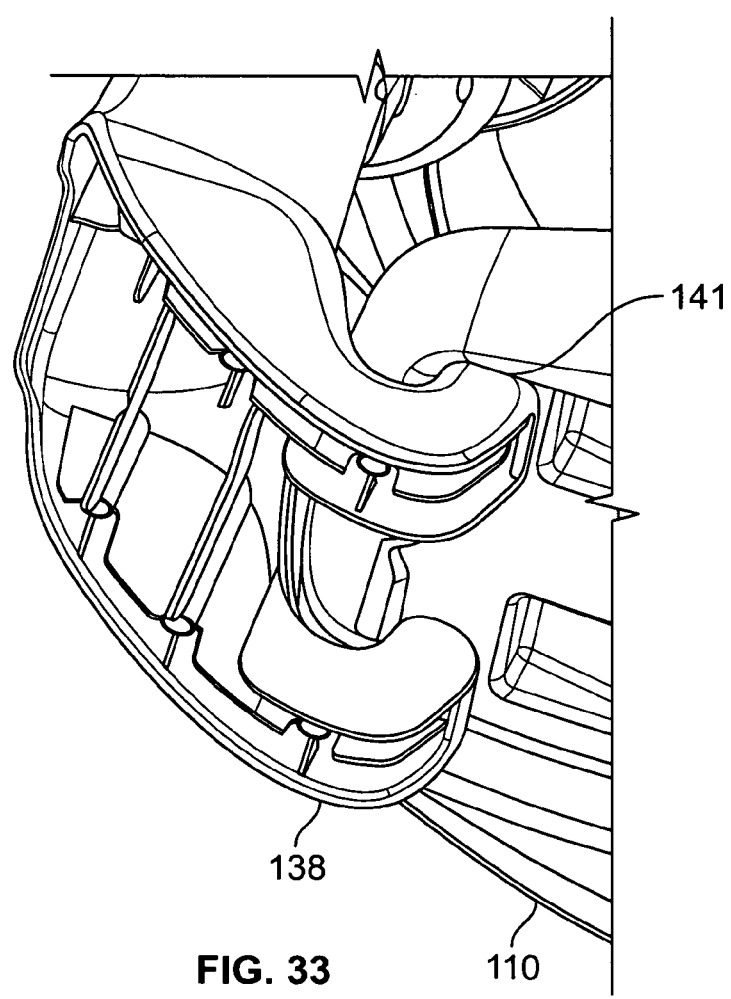

As illustrated in FIGS. 27 and 28, the tricycle may be provided with a removable safety arm/snack tray attachment 130 that features a rim portion 132 that surrounds a child as he or she sits in the seat 112. The rim may feature snack compartments 134 and a cup holder 136. A lower hook portion 138 is connected to the front underside of the rim 132 and, as explained in greater detail below, is used to secure the safety arm/snack tray attachment to the tricycle. As illustrated in FIG. 28, the back of the rim 132 of the safety arm/snack tray attachment is provided with threaded knobs 140a and 140b that removably engage corresponding threaded openings 139a and 139b (FIG. 29) formed in the back of the seat 110. See also FIG. 30.

Installation of the safety arm/snack tray attachment 130 is illustrated in FIGS. 31-35. As illustrated in FIGS. 31-34, the lower hook portion 138 is positioned under the front edge of the seat 110 and engages corresponding recesses 141 (FIG. 33) formed in the underside of the seat. As illustrated in FIGS. 27 and 28, the lower hook portion 138 also engages the main tube 148 of the tricycle. See also FIGS. 34 A and B.

Figure 34A:
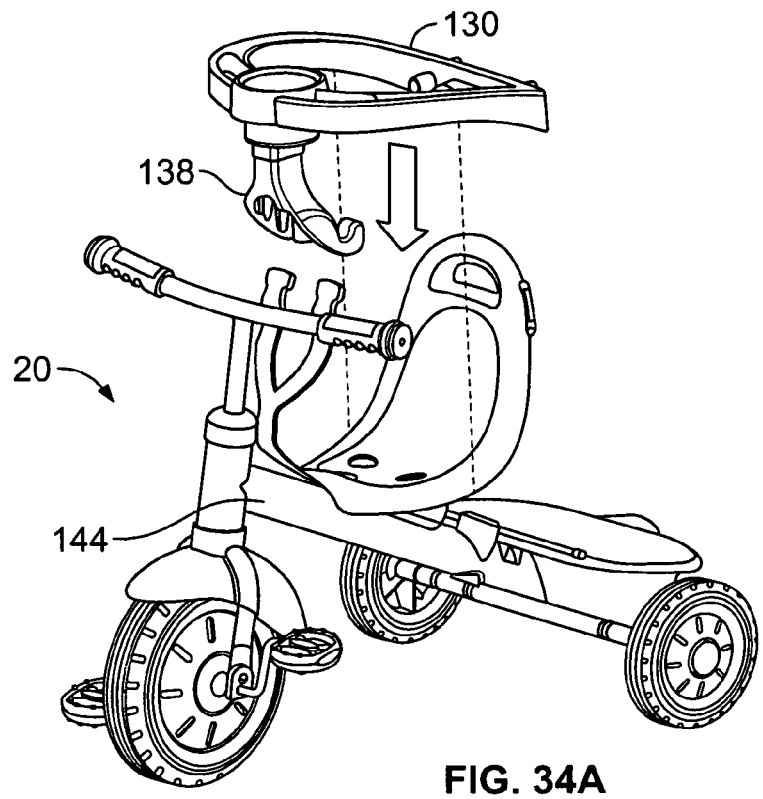
Figure 34B:
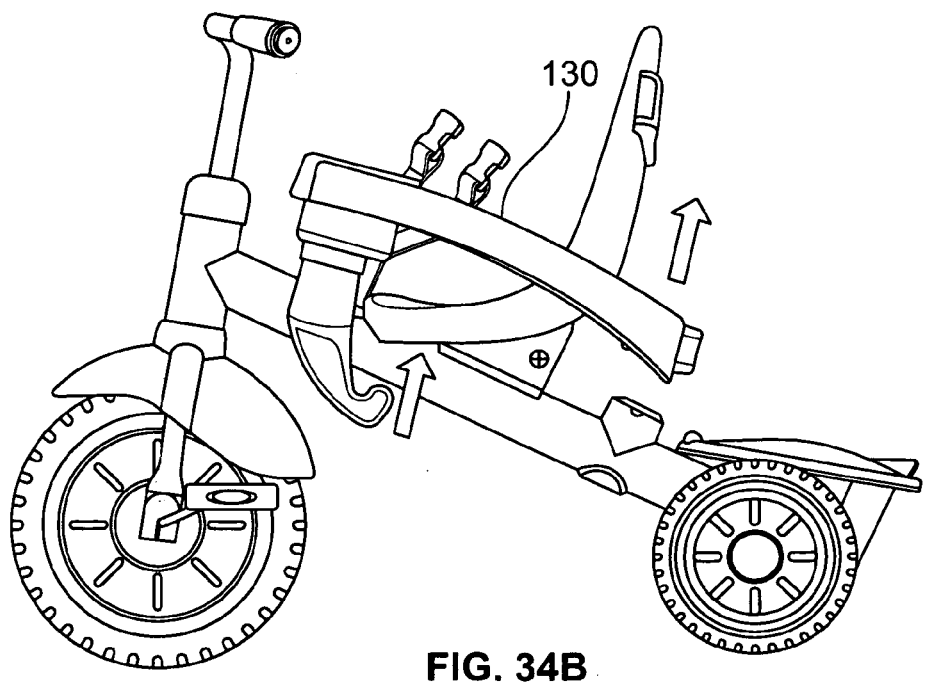
Figure 34C:
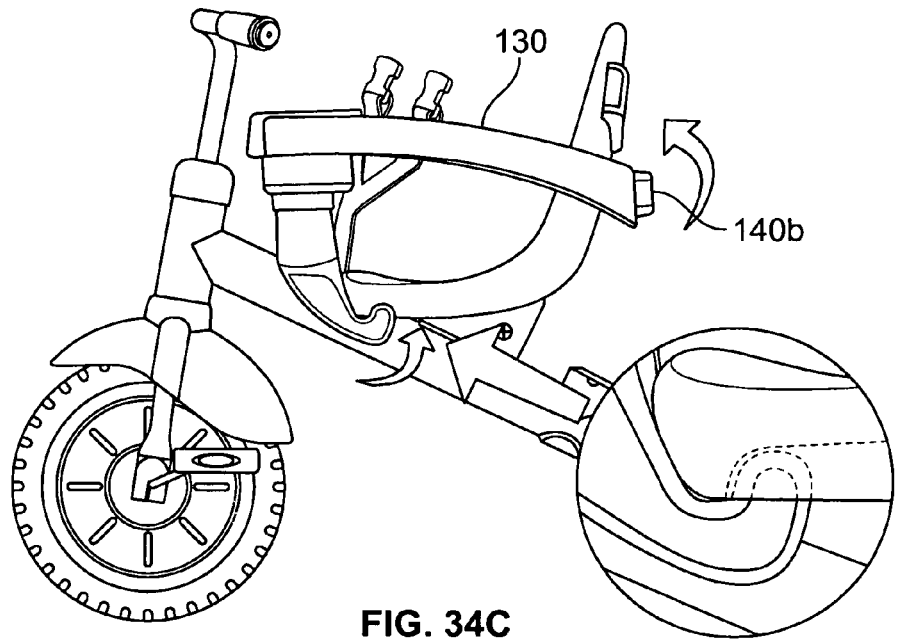
Figure 35A:
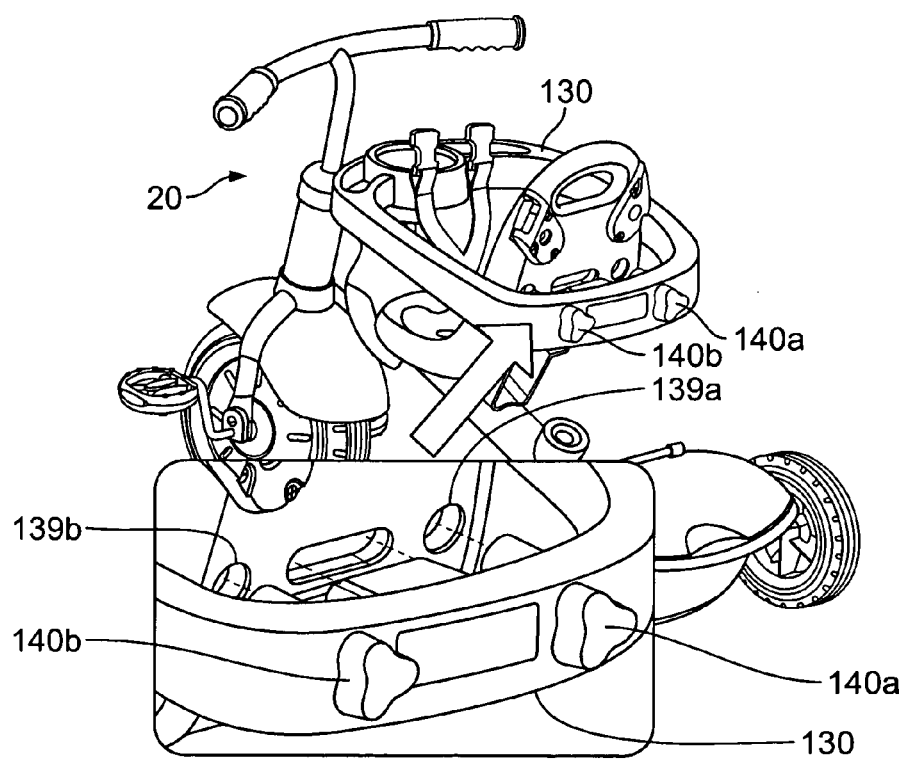
Figure 35B:
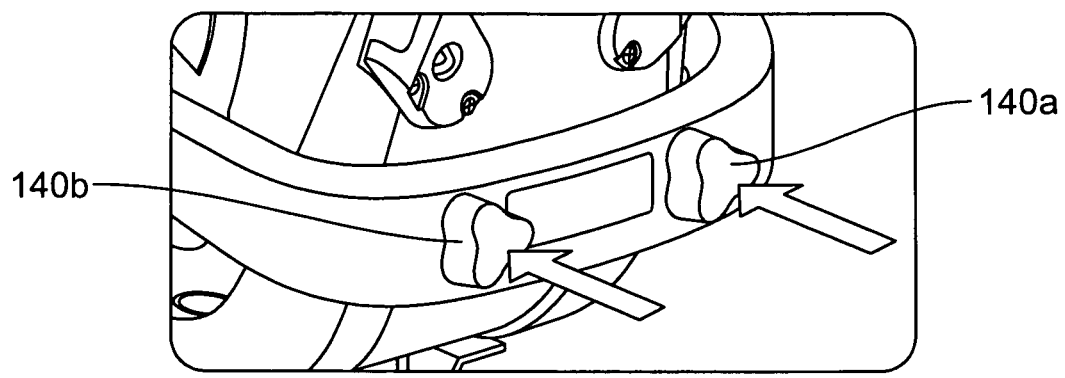
Figure 35C:
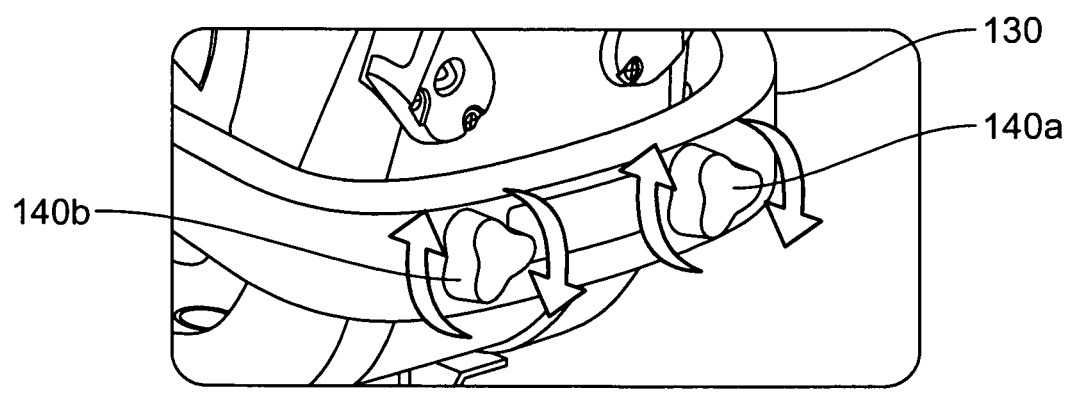

Next, as illustrated FIGS. 34B and C, the trailing portion of the attachment 130 is raised so that the threaded knobs 140a and 140b may engage the threaded openings 139a and 139b (FIG. 29) of the tricycle seat back surface. Finally, as illustrated in FIG. 35, the threaded knobs 140a and 140b are pushed in and turned clockwise to secure the safety arms/snack tray attachment 130 in place on the tricycle (also shown in FIGS. 1 and 2A).

Figure 36:
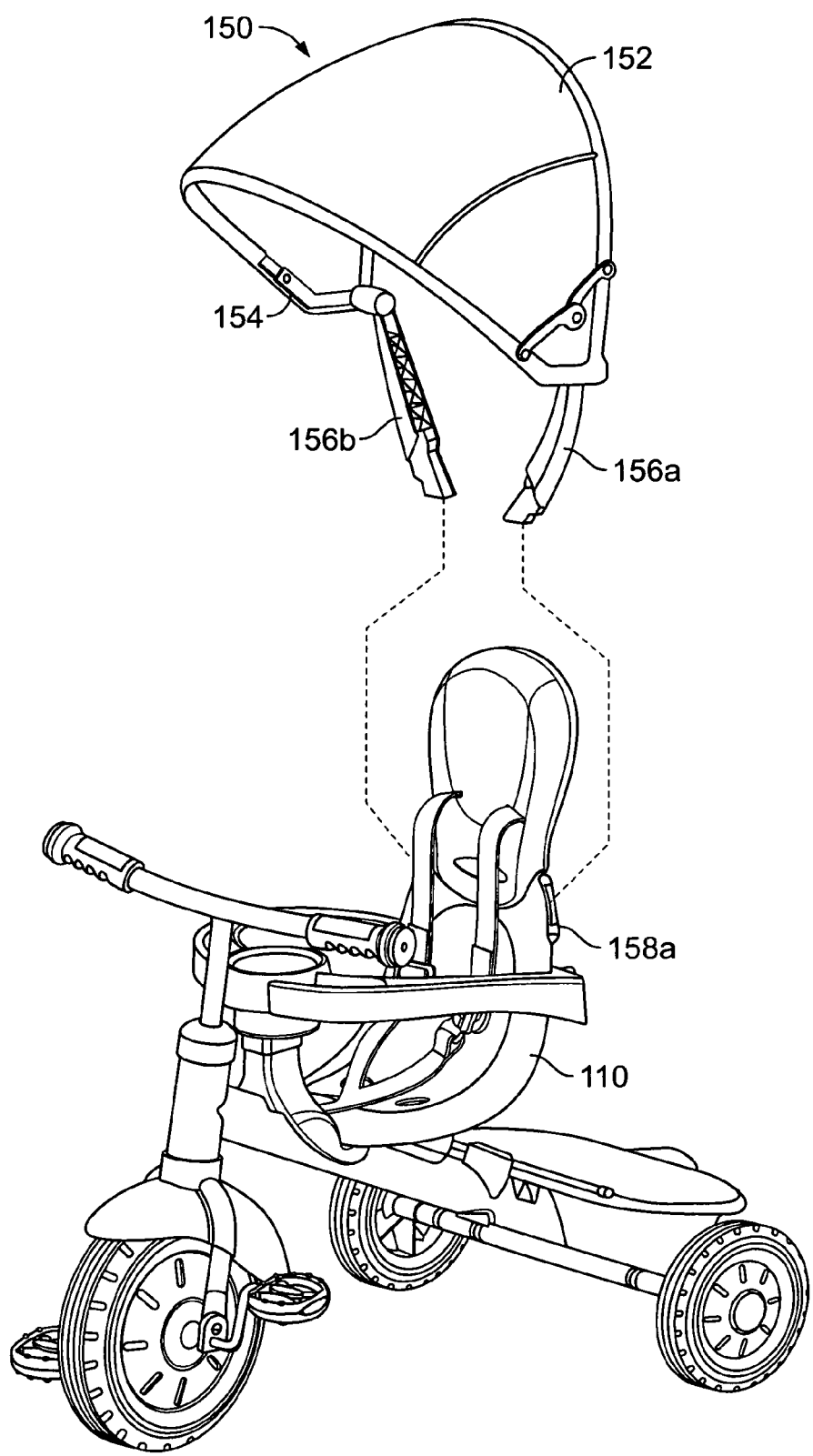
Figure 37:
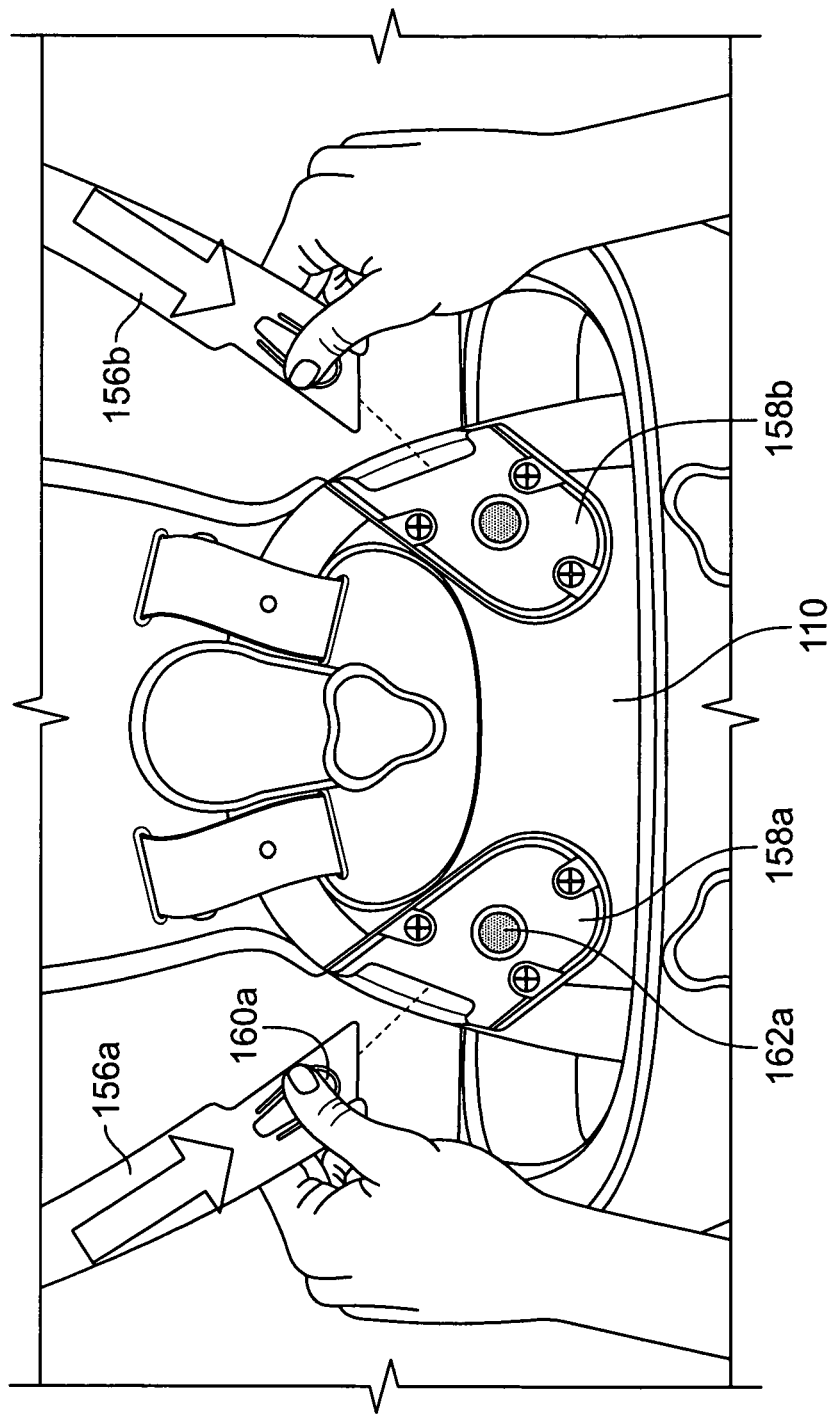
Figures 41, 42:
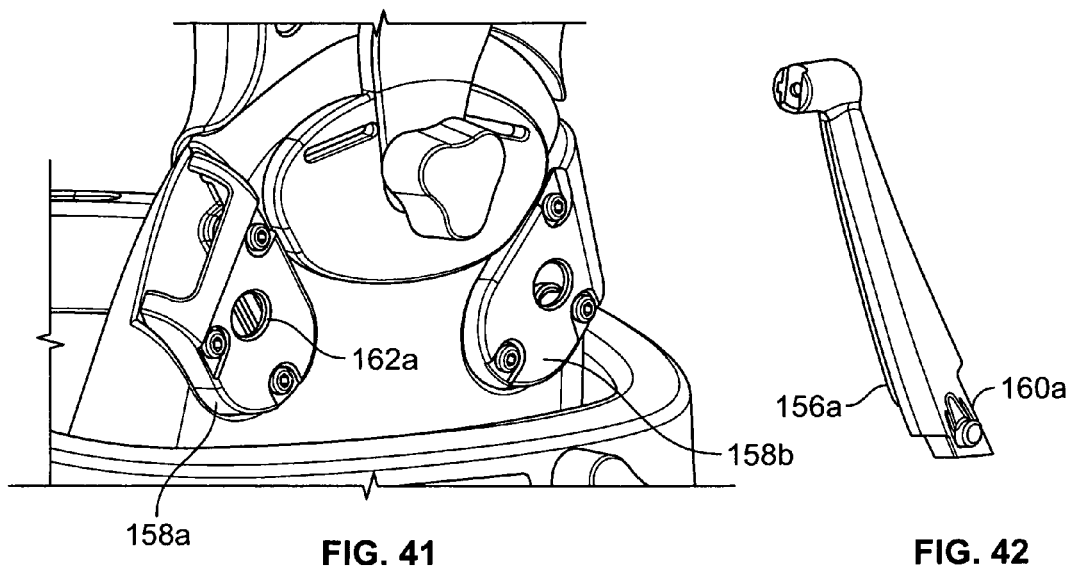
Figure 43:
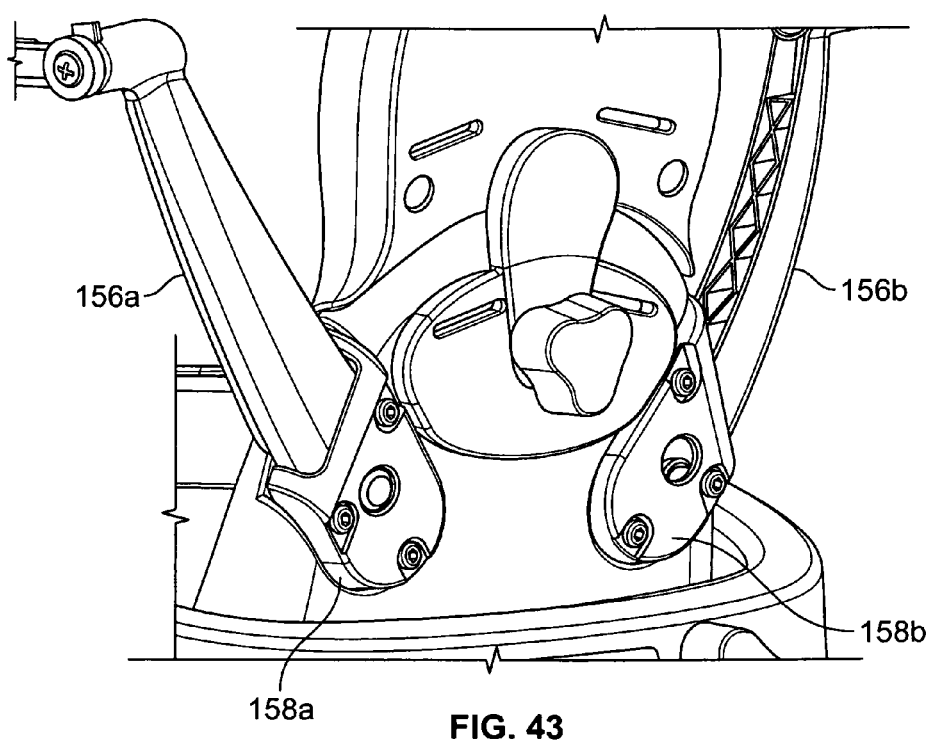
Figure 44:
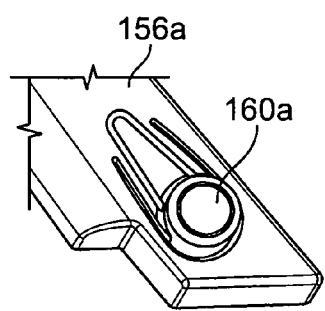
Figure 45:
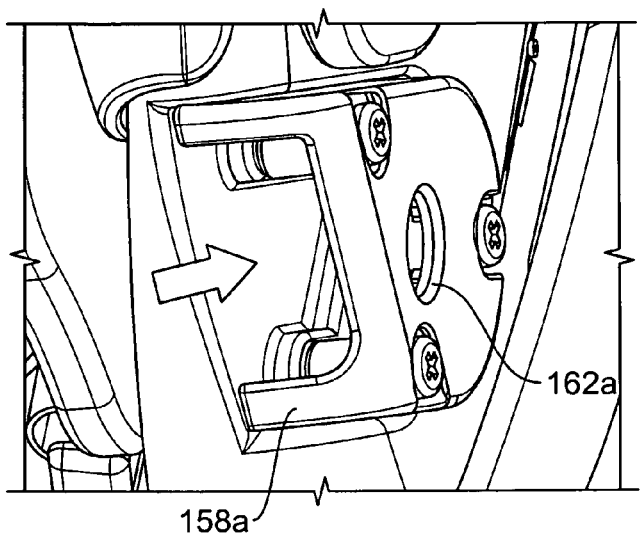
Figure 46:
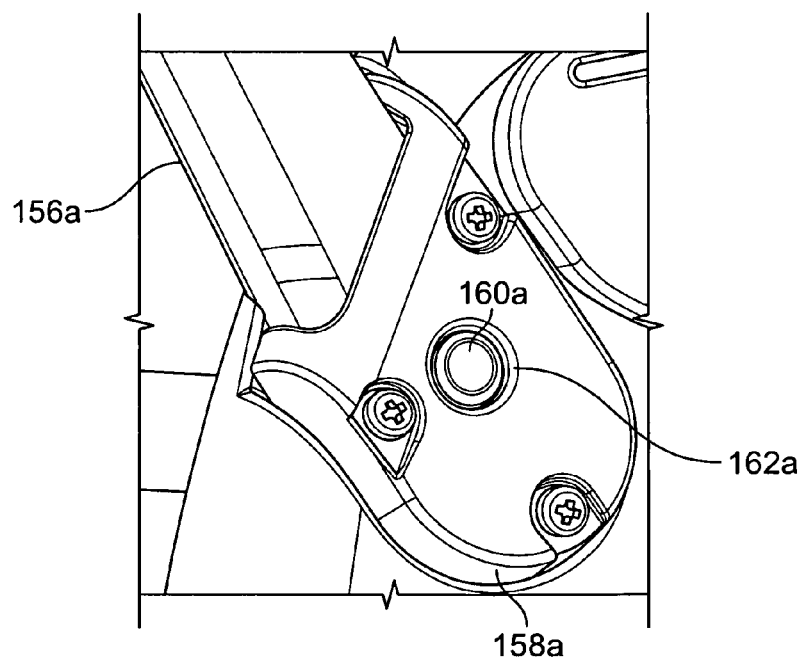

Installation of the tricycle canopy 150 is illustrated in FIGS. 36-46. With reference to FIGS. 1 and 36, the canopy features a fabric portion 152 that is supported by a frame portion 154. The frame portion 154 is pivotally attached on opposing sides to canopy arms 156a and 156b. The canopy arms 156a and 156b attach the canopy to the tricycle via sockets 158a and 158b (FIG. 37 positioned on the back of the tricycle seat 110. With reference to FIGS. 38, 39 and 41-46, the lower end of canopy arm 156a is provided with retracting button 160a that engages a corresponding opening 162a formed in the socket 158a when the canopy arm 156a is inserted within the socket 158a. Button 160a may be pushed to remove the canopy arm 156a from socket 158a. Canopy arm 156b and socket 158b feature a similar construction.

As illustrated in FIG. 40, the canopy may be open or closed by manipulating the pivotally joined links 166a and 166b of the canopy frame mechanism. The links of FIG. 40 are present on the opposite side of the canopy as well. The links lock in the position shown in FIG. 40C, but may be unlocked for folding the canopy by pushing upwards on the central pivot point 168.

Figure 47C:
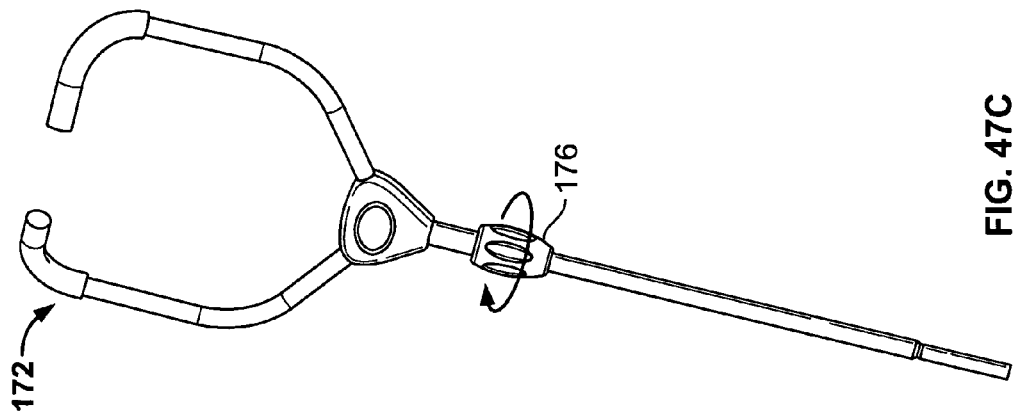
FIGS. 47A-47C are perspective views illustrating adjustment of the height of the push handle of the tricycle of FIG. 1.
Figure 47B:
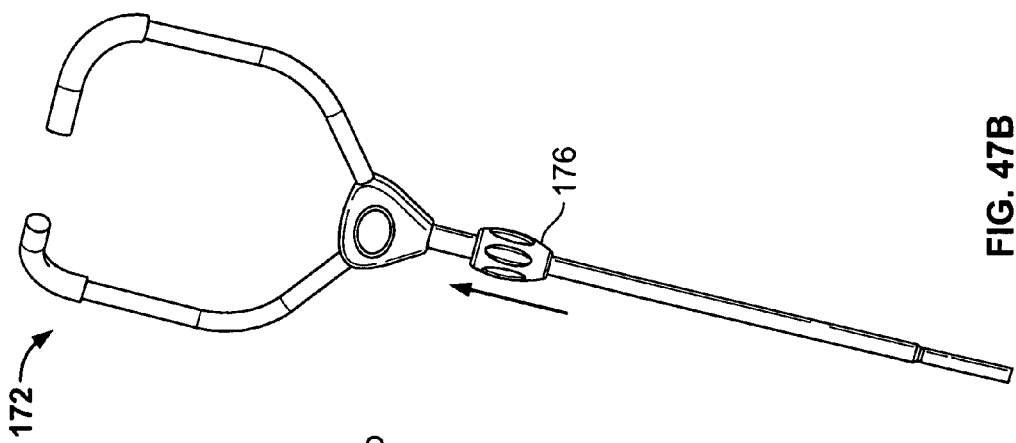
Figure 47A:
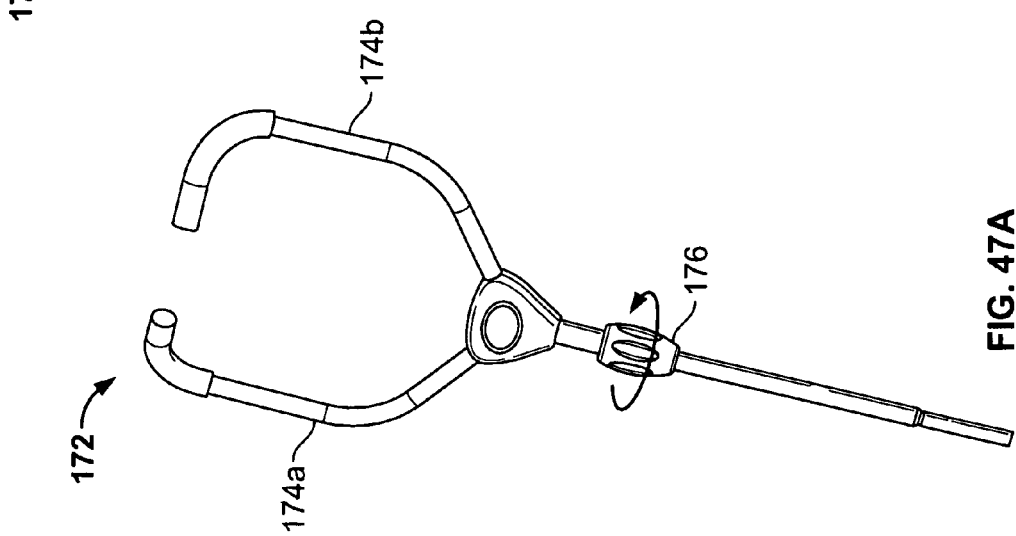

The tricycle 20 (FIG. 1) is preferably provided with a telescoping push handle 172. The lower end of the push handle attaches to the frame of the tricycle and preferably controls steering of the tricycle through the attachment arrangement and steering mechanism of commonly owned U.S. Pat. No. 6,840,527 to Michelau et al., the contents of which are hereby incorporated by reference. The upper end of the push handle features first and second hand grips 174a and 174b. The push handle also includes a height adjustment knob 176. The height of the push handle may be adjusted by first twisting the knob in a counter clockwise direction to release the telescoping mechanism, as illustrated in FIG. 47A. The top portion of the push handle (including hand grips 174a and 174b) may then be raised or lowered to the desired height, as illustrated in FIG. 47B. As illustrated in FIG. 47C, the knob 176 is then rotated clockwise to lock the top portion of the push handle at the selected height.

While the preferred embodiments of the invention have been shown and described, it will be apparent to those skilled in the art that changes and modifications may be made therein without departing from the spirit of the invention, the scope of which is defined by the appended claims.

What is claimed is:

1. A wheel and hub assembly for a vehicle comprising:
 a. a wheel;
 b. a clutch dog pivotally attached to the wheel;
 c. a pedal crank;
 d. a toothed ratchet wheel attached to the pedal crank and positioned adjacent to the clutch dog;
 e. a hub cover having an exterior surface with a face portion and a flange extending from the periphery of the face portion, said hub cover having a protrusion and being coupled to the wheel and capable of sliding between:
  i) an unlocked position where the protrusion engages the clutch dog so as to prevent the clutch dog from engaging the toothed ratchet wheel when the pedal crank is turned in a forward direction; and
  ii) a locked position where the protrusion does not engage the clutch dog so that the clutch dog engages the toothed ratchet wheel when the pedal crank is turned in a forward direction.

2. The wheel and hub assembly of claim 1 wherein the hub cover further includes a rib that engages and urges the clutch dog into engagement with the toothed ratchet wheel when the hub cover is in the locked position.

3. The wheel and hub assembly of claim 2 wherein the protrusion is arch-shaped.

4. The wheel and hub assembly of claim 1 further comprising a torsion spring that engages and urges the clutch dog into engagement with the toothed ratchet wheel when the hub cover is in the locked position.

5. The wheel and hub assembly of claim 4 wherein the protrusion is arch-shaped.

6. The wheel and hub assembly of claim 1 further comprising a pair of mounting plates with the clutch dog and the toothed ratchet wheel positioned there between, with one of the mounting plates attached to the wheel and the clutch dog attached to the mounting plates by a pin.

7. The wheel and hub assembly of claim 6 wherein rubber washers are positioned on the pin between the clutch dog and each of the mounting plates.

8. The wheel and hub assembly of claim 6 further comprising a cover disk attached to one of the mounting plates with the wheel between the cover disk and one of the mounting plates.

9. The wheel and hub assembly of claim 1 wherein the wheel has a central opening through which the pedal crank passes.

10. The wheel and hub assembly of claim 1 wherein the protrusion prevents the clutch dog from bottoming out on the toothed ratchet wheel when the hub cover is in the locked configuration.

11. A tricycle comprising:
 a. a frame;
 b. a pair of rear wheels attached to a rear portion of the frame;
 c. handlebar pivotally attached to a front portion of the frame;
 d. a front wheel rotatably attached to the handlebars;
 e. a clutch dog pivotally attached to the front wheel;
 f. a pedal crank;
 g. a toothed ratchet wheel attached to the pedal crank and positioned adjacent to the clutch dog;
 h. a hub cover having an exterior surface with a face portion and a flange extending from the periphery of the face portion, said hub cover having a protrusion and being coupled to the wheel and capable of sliding between:
  i) an unlocked position where the protrusion engages the clutch dog so as to prevent the clutch dog from engaging the toothed ratchet wheel when the pedal crank is turned in a forward direction; and
  ii) a locked position where the protrusion does not engage the clutch dog so that the clutch dog engages the toothed ratchet wheel when the pedal crank is turned in a forward direction.

12. The tricycle of claim 11 wherein the hub cover further includes a rib that engages and urges the clutch dog into engagement with the toothed ratchet wheel when the hub cover is in the locked position.

13. The tricycle of claim 12 wherein the protrusion is arch-shaped.

14. The tricycle of claim 11 further comprising a torsion spring that engages and urges the clutch dog into engagement with the toothed ratchet wheel when the hub cover is in the locked position.

15. The tricycle of claim 11 further comprising a pair of mounting plates with the clutch dog and the toothed ratchet wheel positioned there between, with one of the mounting plates attached to the wheel and the clutch dog attached to the mounting plates by a pin.

16. The tricycle of claim 15 wherein rubber washers are positioned on the pin between the clutch dog and each of the mounting plates.

17. The tricycle of claim 15 further comprising a cover disk attached to one of the mounting plates with the wheel between the cover disk and one of the mounting plates.

18. The tricycle of claim 11 wherein the wheel has a central opening through which the pedal crank passes.

19. The tricycle of claim 11 wherein the protrusion prevents the clutch dog from bottoming out on the toothed ratchet wheel when the hub cover is in the locked configuration.

20. The tricycle of claim 1 wherein the protrusion is located radially inward of the ridge portion of the hub cover.

* * * * *